3,383,411
4-ALKANOYLPHENOXY-ALKANOIC ACIDS
Everett M. Schultz, Ambler, and James M. Sprague, Gwynedd Valley, Pa., assignors to Merck & Co., Inc., Rahway, N.J., a corporation of New Jersey
No Drawing. Continuation-in-part of application Ser. No. 155,961, Dec. 6, 1961. This application Feb. 17, 1964, Ser. No. 345,062
19 Claims. (Cl. 260—521)

This application is a continuation-in-part of U.S. Patent application Ser. No. 155,961 filed Dec. 6, 1961, and now U.S. Patent No. 3,255,241.

This invention relates to a new class of 4-alkanoylphenoxy and 4 - alkanoylphenylthio substituted alkanoic acids, their esters and their amide derivatives; compounds which are characterized by the presence of a nuclear substituent on the 3-position carbon of the benzene ring.

Pharmacological studies of the above-described products demonstrate that they possess diuretic properties and are thus useful in therapy for the treatment of conditions resulting from an excessively high retention of electrolyte or fluid within the body, such as in the treatment of edematous conditions resulting, for example, from congestive heart failure.

The novel acids of the invention are compounds having the following structural formula:

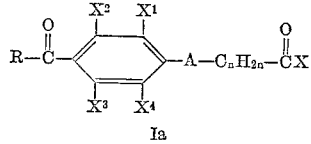

Ia wherein A is a member selected from the group consisting of oxygen and sulfur, R is a member selected from the group consisting of lower alkyl containing at least three carbon atoms, cycloalkyl, e.g., cycloalkyl containing 3–6 nuclear carbon atoms, such as cyclopropyl, cyclobutyl, cyclopentyl, cyclohexyl, cycloalkylalkyl, e.g., cycloalkylalkyl containing 3–6 nuclear carbon atoms, such as cyclopentylmethyl, cyclohexylmethyl, etc., and aralkyl, e.g., benzyl, phenethyl, phenylpropyl, etc., X is a member selected from the group consisting of hydroxy, alkoxy, e.g., lower alkoxy and

wherein $R^1$ and $R^2$ represent a member selected from the group consisting of hydrogen and lower alkyl, $X^1$ is a member selected from the group consisting of hydrogen, halogen, lower alkyl and nitro, $X^2$ is a member selected from the group consisting of halogen, lower alkyl, trifluoromethyl, acetamido and carboxyalkyloxy, e.g., carboxymethyloxy, $X^3$ and $X^4$ each represents a member selected from the group consisting of hydrogen, halogen and lower alkyl and $n$ is an integer having a value of 1–5.

A preferred embodiment of the invention comprises a compound of the following formula:

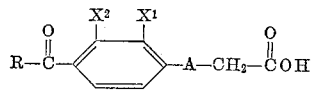

wherein A is a member selected from the group consisting of oxygen and sulfur, R is lower alkyl containing at least three carbon atoms, $X^1$ is a member selected from the group consisting of hydrogen, halogen and lower alkyl and $X^2$ is a member selected from the group consisting of halogen and lower alkyl.

This invention also relates to the acid addition salts of the instant alkanoic acids, which are prepared by the reaction of the said acids with a base having a non-toxic, pharmacologically acceptable cation. In general, any base which will form an acid addition salt with the instant alkanoic acids and whose pharmacological properties will not cause an adverse physiological effect when ingested by the body system is considered as being within the scope of this invention; suitable bases thus include, for example, the alkali metal and alkaline earth metal hydroxides, carbonates, etc., ammonia, primary, secondary and tertiary amines, such as monoalkyl amines, dialkylamines, trialkylamines, nitrogen containing heterocyclic amines, e.g., piperidine, etc. The acid addition salts thus produced are the functional equivalent of the corresponding acid and one skilled in the art will appreciate that to the extent that the alkanoic acids of the invention are useful in therapy, the variety of said acid addition salts is limited only by the criterion that the bases employed in forming the salts be both non-toxic and physiologically acceptable.

The compounds of the invention may be prepared by a variety of methods but generally the most advantageous route consists in the reaction of alkanol halide with the appropriate phenoxy- or phenylthioalkanoic acid in the presence of a metallic halide to produce the corresponding 4 - alkanoylphenoxy- or 4 - alkanoylphenylthioalkanoic acid. The following equation illustrates the reaction:

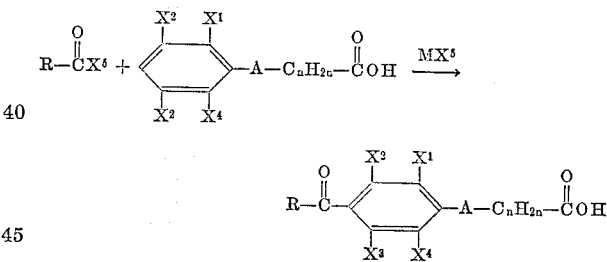

wherein the A, R, $X^1$, $X^2$, $X^3$, $X^4$ and $n$ radicals are as defined above, $X^5$ represents halogen and $MX^5$ represents a metallic halide. The said metallic halides serve as catalysts in promoting the condensation of the alkanoyl halide reactant with the phenoxy- or phenylthioalkanoic acid; catalysts which we have found to be particularly suitable for this purpose include anhydrous aluminum chloride and boron trifluoride. The reaction solvent and the temperature at which the reaction is conducted are not particularly critical aspects of the reaction inasmuch as any solvent which is inert to the acid halide and phenoxy- or phenylthioalkanoic acid and the metallic halide catalyst may be employed with good results and the reaction temperature may be varied to obtain the desired rate of reaction. We have found, however, that carbon disulfide and petroleum ether are particularly suitable solvents in which to conduct the reaction and that the reaction proceeds most advantageously with slight heating as, for example, at reflux temperatures by heating on a steam bath.

The compounds of the invention may also be prepared by an alternative method. According to this method an appropriate alkanoyl halide is treated with a suitable nuclearly substituted anisole, phenetole or other functionally equivalent ether. The reaction is conducted in the presence of one of the metallic halides described in the preceding paragraph, e.g., anhydrous aluminum chloride, and in the presence of a suitable solvent; suitable solvents include, for example, ligroin and carbon disulfide. The acylated phenetole or anisole is then converted to the corresponding phenol by treating the said ether with an additional amount of aluminum chloride with heating in a ligroin or heptane solvent. The 4-alkanoylphenol thus produced is then reacted with an appropriate halo substituted alkanoic acid ester in the presence of a base to obtain the corresponding 4-alkanoylphenoxy substituted alkanoic acid ester and the ester thus obtained is hydrolyzed in the presence of sodium hydroxide to generate the desired (4-alkanoylphenoxy) alkanoic acid product. The following equation illustrates this method of prepartion:

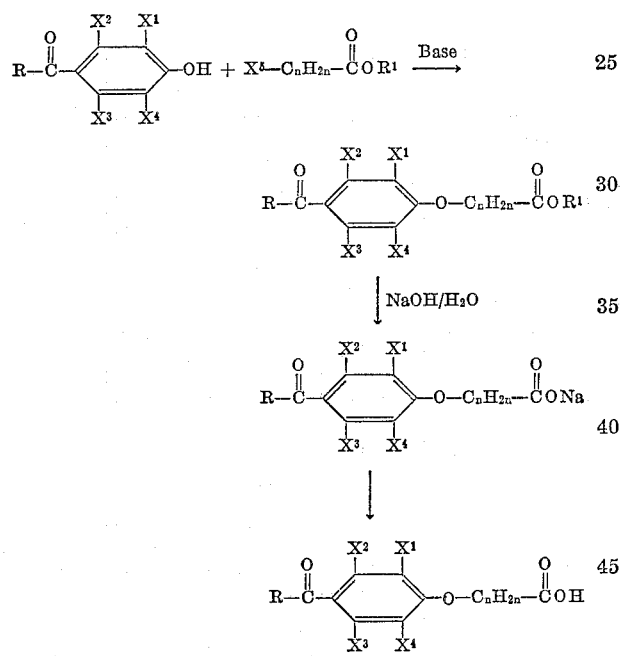

wherein the base employed in the above equation is sodium hydride in glyme (i.e., 1,2-dimethoxymethane), sodium amide in benzene, sodium ethoxide in ethanol or potassium ethoxide in ethanol, $R^1$ represents an hydrocarbyl radical, i.e., a monovalent radical composed solely of carbon and hydrogen, e.g., alkyl, cycloalkyl, alkenyl, aralkyl, etc., and wherein the radicals R, $X^1$, $X^2$, $X^3$, $X^4$, $X^5$ and $n$ are as defined above. However, in lieu of employing the ester derivatives of the said halo substituted alkanoic acids we have found that the above reaction may also be carried out with good results by employing the corresponding halo substituted alkanoic acids per se (i.e., the radical $R^1$ in the above equation represents hydrogen). According to this method of preparation an appropriate 4-alkanoylphenol is reacted with a suitable halo substituted alkanoic acid in the presence of a base, such as sodium hydroxide, and the mixture is acidified to obtain the desired (4-alkanoylphenoxy) alkanoic acid product. The following equation illustrates the reaction:

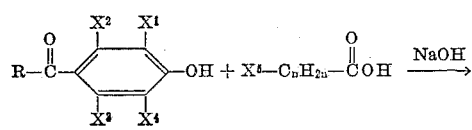

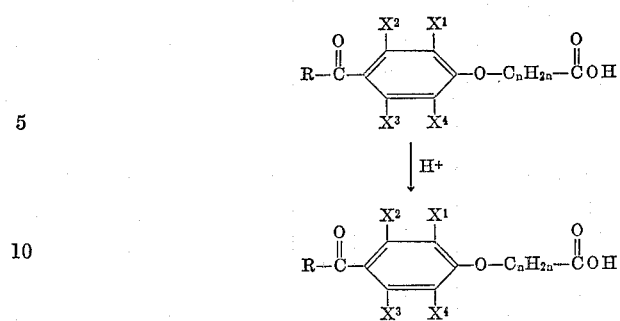

wherein the radicals R, $X^1$, $X^2$, $X^3$, $X^4$, $X^5$ and $n$ are as defined above.

Another method by which the 4-alkanoylphenoxy and 4-alkanoylphenylthio substituted alkanoic acids of the invention are prepared comprises the hydrogenation of a [4-(2-alkylidenealkanoyl)phenoxy]- or [4-(2-alkylidenealkanoyl)phenylthio]-alkanoic acid to its saturated derivative. Under the conditions of the reaction the alkylidene group is reduced to its corresponding alkyl analog to form the branched chain alkanoyl derivative of its phenoxy- or phenylthio- alkanoic acid precursor; the products of the process may thus be described as (4-alkanoylphenoxy)alkanoic acids and (4-alkanoylphenylthio)-alkanoic acids characterized by the presence of an alkyl substituent in the alpha-position of the alkanoyl chain. The following equation, wherein the 2-alkylidene group is a methylene radical, illustrates these products and the method for their preparation:

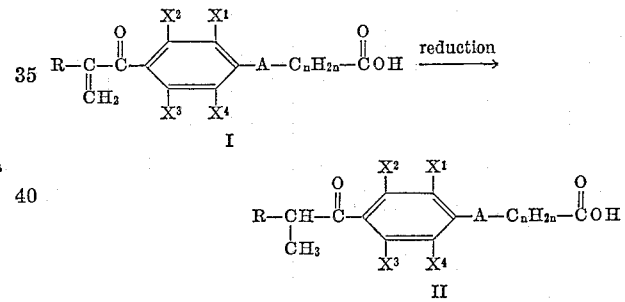

wherein the radicals A, R, $X^1$, $X^2$, $X^3$, $X^4$ and $n$ are as defined above. One skilled in the art will readily perceive the variety of reducing means by which the [4-(2-alkylidene)phenoxy]- or [4 - (2-alkylidene)phenylthio]-alkanoic acid reactant (I) may be converted to the desired product (II). We have employed both catalytic hydrogenation and chemical reduction for this purpose with equally good results. For example, hydrogenation in the presence of palladium on charcoal in the presence of an alcohol solvent, such as isopropyl alcohol, is a particularly advantageous catalyst with which to reduce the alkylidene group of reactant I (supra) to its corresponding alkyl analog II. Another reducing agent which we have found to be particularly effective is potassium borohydride in methanol. However, we do not wish to be limited to the use of any precise reducing means in the conversion of the alkylidene reactant I to the desired alkanoyl product II because any one of a variety of reductants and processes well-known to those skilled in the art may be employed in a similar manner to achieve the desired result.

The [4-(2-methylenealkanoyl)phenoxy]- and [4-(2-methylenealkanoyl)phenylthio]-alkanoic acid reactants, identified as I in the foregoing equation, are prepared by the reaction of a 4-alkanoylphenoxy- or 4-alkanoylphenylthio-alkanoic acid with formaldehyde or paraformaldehyde and the acid addition salt of a secondary amine as, for example, the acid addition salt of a di-lower alkyl amine, piperidine or morpholine, to produce the corresponding [4 - (2 - secondary-aminomethylalkanoyl)-phenoxy]- and [4-(2-secondary-aminomethylalkanoyl)- phenylthio]-alkanoic acid salt. This derivative is then treated with a weak base, such as sodium bicarbonate, either with or without heat, to obtain the desired saturated acyl compound. The following equation depicts this reaction:

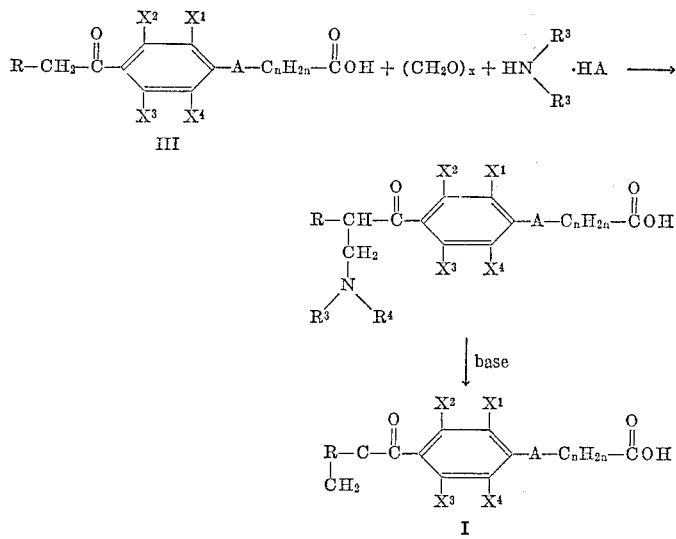

wherein the radicals A, R, $X^1$, $X^2$, $X^3$, $X^4$ and $n$ are as defined above,

is a member selected from the group consisting of di-lower-alkylamine, piperidine and morpholine, HA is an organic or inorganic acid capable of forming salts with amines, e.g., hydrochloric acid and $x$ is the integer 1 or a number greater than 1. The saturated acyl starting materials employed as the reactants (III) in the above synthesis are prepared by the Friedel-Craft's reaction of a saturated alkanoyl halide with the appropriate phenoxy or phenylthio substituted alkanoic acid in the presence of a metallic halide. The reaction is most advantageously conducted in the presence of an inert solvent as, for example, carbon disulfide.

According to an alternative process the unsaturated acyl starting materials identified as I may also be prepared by the reaction of a 2-methylenealkanoyl halide with a phenoxy- or phenylthio-alkanoic acid in the presence of a metallic halide. The following equation illustrates the reaction:

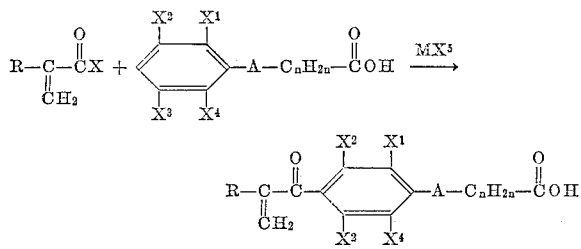

wherein the radicals A, R, $X^1$, $X^2$, $X^3$, $X^4$ and $n$ are as defined above, X represents halogen, e.g., chlorine, bromine, etc., and $MX^5$ represents a metallic halide, such as anhydrous aluminum chloride and boron trifluoride. The reaction is advantageously conducted in the presence of a carbon disulfide or petroleum ether solvent with slight heating as, for example, by heating at reflux temperatures on a steam bath.

The ester and amide derivatives of the instant alkanoic acids are prepared by conventional methods well-known to those skilled in the art; thus, for example, the said ester derivatives may be prepared by the reaction of the alkanoic acid product of the invention with an alcohol as, for example, with a lower alkyl alcohol to prepare the corresponding ester or, alternatively, converting the alkanoic acid product to its acid halide by conventional methods and treating the acid halide thus formed with the appropriate lower alkanol. Similarly, the amide derivatives of the instant alkanoic acids may be prepared by treating the acid halide of the instant acids with ammonia or an appropriate alkylamine or dialkylamine to produce the corresponding amide. Another process for preparing the said amide derivatives comprises the conversion of the acid products of the invention to their corresponding ester derivatives and treating the said ester with ammonia or an appropriate alkylamine or dialkylamine to produce the corresponding amide. The ester derivatives of the alkanoic acids of the invention may also be prepared inherently during the process by employing the ester analogs of the corresponding halo-alkanoic acid ester reactants described in the preparative methods discussed above. These and other equivalent methods for the preparation of the ester and amide derivatives of the instant alkanoic acids will be apparent to one having ordinary skill in the art and to the extent that the said derivatives are both non-toxic and physiologically acceptable to the body system the said esters and amides are the functional equivalent of the corresponding alkanoic acid products.

One skilled in the art will also appreciate that inasmuch as the (4-alkanoylphenoxy) alkanoic acids and (4-alkanoylphenylthio)alkanoic acids of this invention may contain an asymmetric carbon atom in their respective alkanoyl moieties as, for example, when the radical R in the above planar formulae represents a branched chain lower alkyl group, the said alkanoic acids may be obtained as a racemic mixture comprising their dextro and levo isomeric forms. These optical isomers may be resolved into their dextro and levo fractions by conventional methods.

The alkanoic acid products of the invention are generally obtained as crystalline solids and, if desired, may be purified by recrystallization from a suitable solvent. Suitable solvents include, for example, benzene, cyclohexane, methylcyclohexane, ligroin, ether, butyl chloride, carbon tetrachloride, hexane, ethanol, water, methanol and acetic acid.

The examples which follow are illustrative of the products of the invention. However, the examples are illustrative only and the invention is not to be considered as being limited thereto.

EXAMPLE 1

(3-chloro-4-valerylphenoxy)acetic acid

STEP A.—(3-CHLOROPHENOXY)ACETIC ACID m-Chlorophenol (64.27 g., 0.5 mole) is added to a solution of sodium hydroxide (75 g., 1.875 mole) in 150 ml. of water. To this is added slowly at 40° C. a solution of chloroacetic acid (80.5 g., 0.852 mole) in 80.5 ml. of water. When the addition is complete, the mixture is heated with stirring on a steam bath for 1 hour after which the reaction mixture is cooled and 1 liter of water is added. The solution is filtered and acidified to Congo red with concentrated hydrochloric acid and the pink oil that separates is extracted with ether. The ether solution then is extracted with a total of 400 ml. of a 10% sodium bicarbonate solution in several portions to remove the product from unreacted phenol. Acidification of the sodium bicarbonate extract yields an oil that soon solidifies. The solid is collected and dried in an oven at 65° C. to give 67.8 g. (73%) of (3-chlorophenoxy)acetic acid, M.P. 110–111° C. (corr.).

STEP B.—(3-CHLORO-4-VALERYLPHENOXY) ACETIC ACID

A dry, 1-liter, round flask is equipped with a stirrer and reflux condenser. Into the flask is placed valeryl chloride (36.2 g., 0.30 mole), (3-chlorophenoxy)acetic acid (44.7 g., 0.24 mole) and carbon disulfide (240 ml.). Powdered aluminum chloride (101 g., 0.755 mole) is added in small portions at 10° C. with mechanical stirring. After half of the aluminum chloride is added, the mixture becomes quite viscous and the remainder of the aluminum chloride is added with hand stirring. When the mixture becomes mobile enough, mechanical stirring is resumed and continued for 1 hour. The mixture then is heated at 50° C. with stirring for an additional 3 hours. The carbon disulfide is decanted and the residue is added to a mixture of 1 kg. of ice and 30 ml. of concentrated hydrochloric acid. The oil that separates is extracted with ether and the ether extract then is extracted with 10% sodium bicarbonate solution. The bicarbonate extract is acidified with concentrated hydrochloric acid to give (3-chloro-4-valerylphenoxy)acetic acid which, after crystallization from a 2:1 mixture of ligroin and benzene, yields 30 g. of product, M.P. 82.5–83.5° C. (corr.).

EXAMPLE 2

(3-chloro-4-butyrylphenoxy)acetic acid

Powdered aluminum chloride (217 g., 1.625 mole) and carbon disulfide (400 ml.) are placed in a 1-liter, 4-necked flask equipped with a stirrer, dropping funnel, reflux condenser and internal thermometer. (3-chlorophenoxy)acetic acid (93.3 g., 0.5 mole) is added in portions with stirring and then butyryl chloride (66.6 g., 0.625 mole) is added dropwise with stirring over a period of 0.5 hour at a temperature of about 22–26° C. After stirring one hour at room temperature, the reaction flask is placed in a water bath and the temperature maintained at 50° C. for 3 hours. The carbon disulfide then is decanted and the gummy reaction product obtained is added to a mixture of ice (1 kg.) and concentrated hydrochloric acid (100 ml.). A solid separates and is dissolved in saturated sodium bicarbonate solution (1.5 liters). The solution is filtered, and the clear, yellow filtrate obtained is acidified with hydrochloric acid. The yellow oil that separates solidifies slowly to give a solid melting at 76–85° C. After recrystallization from benzene, there is obtained 66.7 g. (51%) of (3-chloro-4-butyrylphenoxy)acetic acid, M.P. 89–90° C.

EXAMPLE 3

(2,3-dichloro-4-butyrylphenoxy)acetic acid

STEP A.—2′,3′-DICHLORO-4′-HYDROXY- BUTYROPHENONE

Butyryl chloride (128.0 g., 1.2 mole) and 2,3-dichloro- anisole (197.7 g., 1.11 mole) are added to carbon disulfide (400 ml.) in a 2-liter, 3-necked, round-bottomed flask equipped with a stirrer, reflux condenser [protected by a calcium chloride tube and a Gooch sleeve bearing a 250 ml. Erlenmeyer flask containing anhydrous aluminum chloride (160 g.)]. While the reaction mixture is cooled in an ice bath, aluminum chloride (160 g., 1.2 mole) is added in small portions with stirring at such a rate that the temperature of the reaction mixture does not exceed 20–25° C. The ice bath is removed and the mixture stirred at room temperature for 1 hour, then in a water bath at 55° C. for 45 minutes and then kept at room temperature overnight. n-Heptane (400 ml.) and aluminum chloride (160 g.) are added, the condenser set for distillation, the mixture stirred and heated in a water bath, heated by means of a steam bath, and the carbon disulfide distilled. A second portion of heptane (400 ml.) is added, the condenser set for reflux, the reaction mixture stirred and heated in a bath at 80° C. for 3 hours and then allowed to cool. The heptane is decanted and the residue hydroylzed by the slow addition of a solution of concentrated hydrochloric acid (120 ml.) in water (1500 ml.). The brown solid that separates is collected by suction filtration, washed well with water and dissolved in ether. The ether solution is extracted with two liters of 5% sodium hydroxide used in portions. The sodium hydroxide extract is stirred with decolorizing charcoal and filtered through Super-Cel by suction. Upon acidification, the light brown solid that separates is collected by filtration, washed with water and dried at 100° C. for 3 hours. The dried solid is dissolved in hot benzene (1 liter) and the insoluble matter removal by filtration. Upon cooling, the slightly colored solid that separates is dissolved in hot benzene (750 ml.), the solution allowed to cool to room temperature and then chilled to 10° C. in a refrigerator to give 203 g. (85%) of 2′,3′-dichloro-4′-hydroxybutyrophenone, M.P. 109–110.5° C., which is collected by filtration.

STEP B.—ETHYL (2,3-DICHLORO-4-BUTYRYL- PHENOXY)ACETATE

Glycol dimethyl ether [glyme] (100 ml.) is placed in a 1-liter, 4-necked round-bottomed flask equipped with a stirrer, reflux condenser (protected by a calcium chloride tube) and a dropping funnel. Sodium hydride (53%) in mineral oil (10.3 g., 0.215 mole) then is added cautiously and the mixture stirred while a solution of 2′,3′-dichloro-4′-hydroxybutyrophenone (50.0 g., 0.215 mole) in glyme (150 ml.) is added over a period of ½ hour. After frothing has subsided, ethyl bromoacetate 35.9 g., 0.215 mole) is added gradually with stirring. The mixture then is stirred and heated on a steam bath for 3½ hours, and most of the glyme then removed by distillation. Ether (400 ml.) and sufficient water to dissolve the precipitated sodium bromide are added. The ether layer is separated, washed with water and dried over sodium sulfate. The ether is evaporated and the residue distilled, and the portion boiling at 180–195° C. at 0.5 mm. pressure collected. On standing, the distillate soon solidifies to a white solid, amounting to 64 g. (95%) of ethyl (2,3-dichloro-4-butyrylphenoxy)acetate, M.P. 53–54° C.

STEP C.—(2,3-DICHLORO-4-BUTYRYLPHENOXY) ACETIC ACID

Potassium hydroxide (1.32 g., 0.02 mole) is dissolved in absolute methanol (15 ml.) and added to ethyl (2,3-dichloro-4-butyrylphenoxy)acetate (3.0 g., 0.095 mole). The ester dissolved and at once a white solid separates. The solid (2.07 g.) is collected by filtration and dissolved in water. Upon acidification with hydrochloric acid, a white solid (M.P. 102–103° C.) separates. Crystallization from benzene yields 1.5 g. (54%) of 2,3-dichloro-4-butyrylphenoxy)acetic acid, M.P. 100–101° C. After resolidifying the product melts at 110–111° C.

EXAMPLE 4

(3-iodo-4-butyrylphenoxy)acetic acid

This product is prepared following substantially the same procedure described in Example 1, Step B, employing the following substances:

(3-iodophenoxy)acetic acid _____ g__ 55.61 (0.2 M)
Carbon disulfide _____ml__ 450
Butyryl chloride _____g__ 26.64 (0.25 M)
Powdered aluminum chloride _____g__ 86.67 (0.65 M)

This procedure produces a waxy solid in theoretical yield. After four recrystallizations from a mixture of benzene and cyclohexane and one recrystallization from methylcyclohexane there is obtained (3-iodo-4-butyrylphenoxy)acetic acid melting at 86–87° C.

EXAMPLE 5

(3-bromo-4-butyrylphenoxy)acetic acid

This product was prepared following substantially the same procedure described in Example 1, Step B, using the following substances:

(3-bromophenoxy)acetic acid ___g__ 130.7 (0.566 M)
Carbon disulfide _____ml__ 450
Butyryl chloride _____g__ 75.38 (0.7075 M)
Aluminum chloride _____g__ 245.3 (1.8395 M)

The (3-bromo-4-butyrylphenoxy)acetic acid obtained melts at 77–78° C.

EXAMPLE 6

(3-methyl-4-butyrylphenoxy)acetic acid

Powdered aluminum chloride (217 g.) and carbon disulfide (400 ml.) are placed in a 1-liter, 4-necked flask equipped with a stirrer, dropping funnel, reflux condenser and internal thermometer. (3-methylphenoxy)acetic acid (83 g.) is added in portions with stirring and then butyryl chloride (66.6 g.) is added dropwise with stirring over a period of 0.5 hour at a temperature of about 22–26° C. After stirring one hour at room temperature, the reaction flask is placed in a water bath and the temperature maintained at 50° C. for 3 hours. The carbon disulfide then is decanted and the remaining material is added to a mixture of 500 g. of ice and 125 ml. of concentrated hydrochloric acid to give 77 g. (65%) of (3-methyl-4-butyrylphenoxy)acetic acid which, when distilled, melts at 65–66.6° C.

EXAMPLE 7

(3-ethyl-4-butyrylphenoxy)acetic acid

This product is prepared following substantially the same procedure described in Example 1, Step B, using the following substances:

(3-ethylphenoxy)acetic acid ____g__ 72.3 (0.401 M)
Carbon disulfide _____ml__ 400
Butyryl chloride _____g__ 53.39 (0.501 M)
Powdered aluminum chloride ___g__ 173.74 (1.303 M)

The above procedure yields 64 g. (64%) of yellow liquid boiling at 203–205° C. at 0.7 mm. pressure having $n_D^{25}$ 1.5433. Redistillation of the yellow liquid gives (3-ethyl-4-butyrylphenoxy)acetic acid boiling at 197–199° C. at 0.2 mm. pressure, $n_D^{25}$ 1.5428.

EXAMPLE 8

(2,3-dimethyl-4-butyrylphenoxy)acetic acid

This product is prepared following substantially the same procedure described in Example 6 using the following ingredients:

(2,3-dimethylphenoxy)acetic acid _____g__ 90
Butyryl chloride _____g__ 66.6
Carbon disulfide _____ml__ 400
Powdered aluminum chloride _____g__ 217

The above procedure yields 83.7 g. (67%) of crude product which, after recrystallization from a mixture of benzene and cyclohexane, gives (2,3-dimethyl-4-butyrylphenoxy)acetic acid, M.P. 87–88° C.

EXAMPLE 9

(2-isopropyl-4-butyryl-5-methylphenoxy)acetic acid

This product is prepared following substantially the same procedure described in Example 6 using the following substances:

(2-isopropyl-5-methylphenoxy)acetic acid _____g__ 77.5
Butyryl chloride _____g__ 50
Carbon disulfide _____ml__ 350
Powdered aluminum chloride _____g__ 162

The above procedure gives 99.6 g. (96%) of crude product. After recrystallization from methylcyclohexane there is obtained (2-isopropyl-4-butyryl-5-methylphenoxy)acetic acid, M.P. 100–101° C.

EXAMPLE 10

(2,3-trimethyl-4-butyrylphenoxy)acetic acid

This product is prepared by substantially the same procedure described in Example 6 using the following substances:

(2,3,5-trimethylphenoxy)acetic acid _____g__ 97
Butyryl chloride _____g__ 66.6
Carbon disulfide _____ml__ 400
Powdered aluminum chloride _____g__ 217

The above procedure gives 108 g. (82%) of crude product which, after crystallization from methylcyclohexane, gives (2,3,5-trimethyl-4-butyrylphenoxy)acetic acid, M.P. 128–129.5° C.

EXAMPLE 11

(2,3,6-trimethyl-4-butyrylphenoxy)acetic acid

This product is prepared by substantially the same procedure described in Example 6 using the following substances:

(2,3,6-trimethylphenoxy)acetic acid _____g__ 58
Butyryl chloride _____g__ 40
Carbon disulfide _____ml__ 350
Powdered aluminum chloride _____g__ 130

There is obtained by the above process 68 g. (95%) of crude product which, after crystallization from methylcyclohexan, gives (2,3,6-trimethyl - 4 - butyrylphenoxy) acetic acid, M.P. 109.5–112° C.

EXAMPLE 12

(2-methyl-3-chloro-4-butyrylphenoxy)acetic acid

The above product is prepared following substantially the same procedure described in Example 6 using the following substances:

(2-methyl-3-chlorophenoxy)acetic acid _____g__ 50
Butyryl chloride _____g__ 33.3
Carbon disulfide _____ml__ 300
Powdered aluminum chloride _____g__ 108.5

The above procedure gives 64 g. (94%) of 2-methyl-3-chloro-4-butyrylphenoxy)acetic acid which, after recrystallization from methylcyclohexane, melts at 91–92.5° C.

EXAMPLE 13

(2-chloro-3-methyl-4-butyrylphenoxy)acetic acid

STEP A.—(2-CHLORO-3-METHYLPHENOXY) ACETIC ACID 2-chloro-3-methylphenol (28.7 g., 0.20 mole) in water (30 ml.) is combined with a solution of sodium hydroxide (32 g., 0.80 mole) in water (100 ml.). To the resulting solution at 45° C. is added, with stirring, a solution of chloroacetic acid (38 g., 0.40 mole) in water (10 ml.) over a period of 1 hour at a temperature of 40–45° C. The temperature is raised to 100° C. over a period of 30 minutes and stirring continued at 100° C. for about 40 minutes. The reaction mixture at 100° C. is treated with a solution of chloroacetic acid (38 g., 0.40 mole) in water over a period of 2 hours. Simultaneously and during the following 3 hours of stirring at 100° C., a solution of sodium hydroxide in water is added at intervals when needed to keep the reatcion mixture basic. The boiling solution is acidified with concentrated hydrochloric acid yielding 28.5 g. (71%) of (2-chloro-3-methylphenoxy) acetic acid melting at 184–185° C.

STEP B.—(2-CHLORO-3-METHYL-4-BUTYRYL-PHENOXY)ACETIC ACID

The above product is prepared following substantially the same procedure as described in Example 6 using the following substances:

(2-chloro-3-methylphenoxy)acetic
  acid _____g__  25   (0.125 M)
Butyryl chloride _____g__  16.6 (0.156 M)
Aluminum chloride _____g__  54   (0.405 M)
Carbon disulfide _____ml__ 200

After treatment of the reaction mixture with ice (500 g.) and concentrated hydrochloric acid (30 ml.), the product is extracted into 400 ml. of ether (which is dried over sodium sulfate) and evaporated in vacuo. The residue is recrystallized from benzene (80 ml.) and cyclohexane (700 ml.) to give 30.8 g. (91%) of (2-chloro-3-methyl-4-butyrylphenoxy)acetic acid which, after another recrystallization from benzene and cyclohexane, melts at 95–97° C.

EXAMPLE 14

[3-chloro-4-(2-ethylbutyryl)phenoxy]acetic acid

STEP A.—2-ETHYL-2'-CHLORO-4'-HYDROXY-BUTYROPHENONE

To a mixture of 3-chlorophenetole (31.52 g., 0.2 mole) and 2-ethyl-butyrylchloride (26.92 g., 0.2 mole) in petroleum ether, aluminum chloride (73.34 g., 0.6 mole) is added gradually with stirring at 0–5° C. over a period of 0.5 hour. The mixture is stirred at 0–5° C. for 20 minutes and then allowed to warm to 25° C. while stirring for an additional three hours. The mixture then is kept at 25–30° C. for 48 hours. The petroleum ether then is decanted and the residue added to 500 g. of ice containing 40 ml. of concentrated hydrochloric acid. The dark oil that separates is extracted wth ether, the ether solution washed with water and extracted with 2.5% sodium hydroxide. The sodium hydroxide extract is treated with Norite, filtered free of carbon and acidified with hydrochloric acid to give a green oil which in turn is extracted with ether. The ether extract is dried over sodium sulfate, the ether evaporated and the residue distilled at 148–181° C. at 0.3 mm. pressure to give 11.44 g. (25%) of 2-ethyl-2'-chloro-4'-hydroxybutyrophenone.

STEP B.—[3-CHLORO-4-(2-ETHYLBUTYRYL)PHENOXY]ACETIC ACID

To a suspension of sodium hydride (51% in mineral oil, 2.42 g., 0.05 mole) in dry glycol dimethyl ether is added slowly the 2-ethyl - 2' - chloro-4'-hydroxybutyrophenone prepared as described in Step A (11.44 g., 0.050 mole) in enough glycol dimethyl ether to dissolve it. The mixture is stirred for 15 minutes and ethyl bromoacetate (8.45 g., 0.050 mole) is added dropwise with stirring. The mixture then is refluxed for 2.5 hours and the glycol dimethyl ether evaporated under reduced pressure at 80–90° C. Sodium hydroxide (4.14 g., 0.101 mole) in 30 ml. of water is added to the residue, the mixture is stirred and heated at 90° C. for 1.5 hours and the residual mineral oil extracted with ether from the cooled solution. The extract is acidified with hydrochloric acid and the solid that separates is dissolved in sodium bicarbonate solution and treated with Norite, filtered and acidified to give 12.3 g. (85%) of [3-chloro-4-(2-ethylbutyryl)phenoxy]acetic acid which, after drying in air, melts at 146–147° C. Crystallization from benzene gives the product melting at 147–149° C.

EXAMPLE 15

(3-chloro-4-isovalerylphenoxy)acetic acid

The above product is prepared following substantially the same procedure described in Example 6 using the following substances:

Isovaleryl chloride _____g__  32.6 (0.272 M)
(3-chlorophenoxy)acetic acid _____g__  44.7 (0.24  M)
Aluminum chloride _____g__ 101   (0.755 M)
Carbon disulfide _____ml__ 250

The crude product obtained as described by the above procedure is obtained in the form of a gummy solid which is triturated with 1 liter of hot 5% sodium bicarbonate and the resulting solution is filtered from insoluble aluminum salts. The filtrate is treated with Darco (decolorizing charcoal) (5 g.) and acidified with hydrochloric acid. The solid that separates is dried and crystallized from benzene to give 33.8 g. of (3-chloro-4-isovalerylphenoxy)acetic acid, M.P. 107–108° C.

EXAMPLE 16

[3-chloro-4-(2-methylisovaleryl)phenoxy]acetic acid

STEP A.—[3 - CHLORO-4-(2-DIMETHYLAMINOMETHYL-ISOVALERYL)PHENOXY]ACETIC ACID HYDROCHLORIDE

In a 100 ml. round flask equipped with an outlet tube suitable for application of intermittent suction, an intimate mixture of (3 - chloro-4-isovalerylphenoxy)acetic acid, obtained as described in Example 15 (27 g., 0.1 mole), paraformaldehyde (3 g., 0.1 mole), dry dimethylamine hydrochloride (8.15 g., 0.1 mole) and acetic acid (0.5 ml.) is heated on the steam bath for about 1.5 hours during which period suction is applied for about 1-minute intervals 5 or 6 times. The warm reaction mixture is added to 50 ml. of hot acetone. Upon cooling, a solid (22 g.) separates which melts at 159–163° C. After digesting this product in hot acetone, the purified [3-chloro - 4-[(2-dimethylaminomethyl)isovaleryl]phenoxy] acetic acid hydrochloride is obtained, M.P. 167–169° C.

STEP B.—[3-CHLORO-4-(2-METHYLENEISOVALERYL)PHENOXY]ACETIC ACID

The Mannich compound obtained as described above (19 g., 0.052 mole) is dissolved in sodium bicarbonate (10% solution) and the resulting solution heated for about 25 minutes on a steam bath, cooled and acidified with 6 N hydrochloric acid to give [3-chloro-4-(2-methyleneisovaleryl)phenoxy]acetic acid which, after crystallization from benzene, melts at 122.5–123.5° C., yield 9 g.

STEP C.—[3-CHLORO-4-(2-METHYLISOVALERYL)PHENOXY]ACETIC ACID

[3 - chloro - 4 - (2-methyleneisovaleryl)phenoxy]acetic acid (8.19 g., 0.0289 mole) is dissolved in isopropyl alcohol (250 ml.) and 5% palladium on charcoal (3 g.) is added. The mixture is hydrogenated at an initial pressure of 35 pounds per square inch on a Parr apparatus. In about 40 minutes the required amount of hydrogen is absorbed. The solution is warmed and filtered to remove the catalyst, the alcohol is evaporated and the residue crystallized from benzene to give 4.95 g. of [3-chloro-4-(2-methylisovaleryl)phenoxy]acetic acid, M.P. 138–139° C.

EXAMPLE 17

(3-chloro-4-isobutyrylphenoxy)acetic acid

The above product is prepared by substantially the same method described in Example 6 using the following substances:

Powdered aluminum chloride _____g__  83.9 (0.63 M)
Carbon disulfide _____ml__ 200
(3-chlorophenoxy)acetic acid _____g__  37.3 (0.20 M)
Isobutyryl chloride _____g__  26.6 (0.25 M)

Crude (3-chloro-4-isobutyrylphenoxy)acetic acid (23.9 g.) is obtained in the form of a solid which is dissolved in a saturated sodium bicarbonate solution. The undissolved yellow solid is removed by filtration and the filtrate acidified with concentrated hydrochloric acid which produces a white precipitate which is collected by filtration and dried at 65° C. yielding 8.93 g. (17.3%) of (3 - chloro-4-isobutyrylphenoxy)acetic acid, M.P. 137–139° C. (corr.).

EXAMPLE 18

[3-chloro-4-(2-methylbutyryl)phenoxy]acetic acid

STEP A.—[3-CHLORO-4-[2-(DIMETHYLAMINOMETHYL) BUTYRYL]PHENOXY]ACETIC ACID HYDROCHLORIDE

This Mannich compound is prepared by substantially the same procedure described in Example 16, Step A, using the following products:

(3 - chloro - 4 - butyrylphenoxy)acetic
  acid, prepared as described in Ex-
  ample 2 _____g__ 5.12 (0.02 M)
Paraformaldehyde _____g__ 0.7 (0.022 M)
Dimethylamine hydrochloride ____g__ 1.78 (0.02 M)
Acetic acid _____drops__ 4

Following the heating of the reaction mixture as described in Example 16, Step A, it is cooled and then triturated with acetone. The white solid that forms is crystallized from acetonitrile and from isopropyl alcohol to give [3-chloro-4-[2-(dimethylaminomethyl)butyryl]phenoxy]acetic acid hydrochloride, M.P. 127–129° C.

STEP B.—[3-CHLORO-4-(2-METHYLENEBUTYRYL) PHENOXY]ACETIC ACID

The Mannich compound obtained as described in Step A is treated with 10% sodium bicarbonate by substantially the same method described in Example 16, Step B, to give 3.7 g. (69%) of crude product, M.P. 108–109.5° C. After recrystallization from a mixture of cyclohexane and benzene there is obtained [3-chloro-4-(2-methylenebutyryl)phenoxy]acetic acid in the form of a colorless crystal, M.P. 109–111° C.

STEP C.—[3-CHLORO-4-(2-METHYLBUTYRYL) PHENOXY]ACETIC ACID

The (3-chloro-4-(2-methylenebutyryl)phenoxy] acetic acid obtained as described above is reduced, following substantially the same procedure described in Example 16, Step C, to give [3-chloro-4-(2-methylbutyryl)phenoxy]acetic acid, M.P. 138.5–139° C.

EXAMPLE 19

[3-chloro-4-(2-methyl-n-valeryl)phenoxy]acetic acid

STEP A.—(3-CHLORO-4-n-VALERYLPHENOXY) ACETIC ACID

This product is obtained following substantially the same procedure described in Example 1, Step B, using the following substances:

n-Valeryl chloride _____g__ 36.2 (0.30 M)
(3-chlorophenoxy)acetic acid ____g__ 44.7 (0.24 M)
Carbon disulfide _____ml__ 240
Powdered aluminum chloride _____g__ 101 (0.755 M)

The crude product obtained by the above procedure is crystallized from a 2:1 mixture of ligroin and benzene to give 30 g. of (3-chloro-4-n-valerylphenoxy)acetic acid, M. P. 82.2–83.5° C. (corr.).

STEP B.—[3 - CHLORO-4-[2-(DIMETHYLAMINOMETHYL)VALERYL]PHENOXY]ACETIC ACID HYDROCHLORIDE

In a 100 ml. round flask equipped with an outlet tube suitable for application of intermittent suction, an intimate mixture of (3 - chloro-4-n-valerylphenoxy)acetic acid (6.76 g., 0.025 mole), paraformaldehyde (0.825 g., 0.0275 mole), dry dimethylamine hydrochloride (2.24 g., 0.0275 mole) and acetic acid (4 drops) is heated on the steam bath for about 1.5 hours during which period suction is applied for about 1-minute intervals, 5 or 6 times. Upon cooling a syrupy residue is obtained which, after trituration with ether, gives 5.4 g. of [3 - chloro - 4- [2 - (dimethylaminomethyl)valeryl]phenoxy]acetic acid hydrochloride in the form of a solid which is collected and used in the following step without further purification.

STEP C.—[3-CHLORO-4-(2-METHYLENEVALERYL) PHENOXY]ACETIC ACID

The Mannich compound prepared as described above is dissolved in water and filtered to remove cloudiness. The clear solution then is made basic with sodium bicarbonate and heated for about 25 minutes on a steam bath, cooled and acidified with 6 N hydrochloric acid to give 1.8 g. of [3 - chloro - 4 - (2 - methylenevaleryl)phenoxy]acetic acid in the form of a solid which, after recrystallization from benzene, gives 1.4 g. of purified product, M.P. 101–102° C.

STEP D.—[3-CHLORO-4-(2-METHYL-n-VALERYL) PHENOXY]ACETIC ACID

The [3 - chloro - 4 - (2 - methylenevaleryl)phenoxy] acetic acid is reduced by substantially the same procedure described in Example 16, Step C, to give [3-chloro - 4 - (2 - methyl - n - valeryl)phenoxy]acetic acid, M.P. 123–124.5° C.

EXAMPLE 20

[3-chloro-4-(4-methylvaleryl)phenoxy]acetic acid

This product is prepared following substantially the same procedure described in Example 1, Step B, using the following substances:

4-methylvaleryl chloride _____g__ 134.6 (0.272 M)
(3-chlorophenoxy)acetic acid ____g__ 44.8 (0.24 M)
Aluminum chloride _____g__ 100.8 (0.755 M)
Carbon disulfide _____ml__ 250

This product is obtained in the form of a colorless solid and after crystallization from a mixture of ether and ligroin there is obtained [3-chloro-4-(4-methylvaleryl)phenoxy]acetic acid, M.P. 89.5–90° C., yield 20 g.

EXAMPLE 21

(3-chloro-4-cyclopropanecarbonylphenoxy)acetic acid

STEP A.—[3-CHLORO-4-(4-CHLOROBUTYRYL) PHENOXY]ACETIC ACID

A solution of 7.75 g. of 4-chlorobutyryl chloride in 25 ml. of carbon disulfide is added dropwise over 20 minutes to a suspension of 33.3 g. of aluminum chloride and 9.4 g. of (3-chlorophenoxy)acetic acid in 75 ml. of carbon disulfide. After stirring at room temperature for 40 minutes the carbon disulfide is decanted and the residual complex is treated with ice in concentrated hydrochloric acid. The mixture is extracted with ether and the extract washed with water and dried over sodium sulfate. After filtering, the ether solution is concentrated to dryness on the steam bath and the residue is crystallized from benzene-methylcyclohexane. The product is identified as [3-chloro-4 - (4 - chlorobutyryl)phenoxy]acetic acid, M.P. 105.5–107° C.

STEP B.—(3-CHLORO-4-CYCLOPROPANECARBONYL-PHENOXY)ACETIC ACID

The product obtained as described in Step A is suspended in water (20 ml.) and a 20% sodium hydroxide solution (10 ml.) is added. An exothermic reaction produces an amber solution which is kept at room temperature for about 25 minutes, then acidified with hydrochloric acid and the solid that precipitates is collected and dissolved in dilute sodium bicarbonate solution. The product is reprecipitated by acidification with hydrochloric acid and redissolved in dilute sodium bicarbonate solution and treated with Darco decolorizing charcoal. The charcoal is removed by filtration, the product precipitated by acidification with hydrochloric acid to give (3-chloro-4-cyclopropanecarbonylphenoxy)acetic acid, M.P. 137–139° C. After crystallization from benzene containing a small quantity of acetone, the product melts at 138–140° C.

EXAMPLE 22

[2,3-dichloro-4(2-methylbutyryl)phenoxy]acetic acid

STEP A.—[2,3 - DICHLORO - 4 - (2 - DIMETHYLAMINOMETHYL)BUTYRYLPHENOXY]ACETIC ACID HYDROCHLORIDE

In a 100 ml. round flask equipped with an outlet tube suitable for application of intermittent suction, an intimate mixture of (2,3-dichloro-4-butyrylphenoxy acetic acid (5.20 g., 0.0179 mole), prepared as described in Example 3, paraformaldehyde (0.63 g., 0.0209 mole), dry dimethylamine hydrochloride (1.59 g., 0.0195 mole) and 4 drops of acetic acid is heated on the steam bath for about 1.5 hours during which period suction is applied for about 1-minute intervals 5 or 6 times. Upon cooling, a solid is obtained which is triturated with ether to give 5.8 g. (85%) of [2,3 - dichloro-4-[(2-dimethylaminomethyl)butyryl]phenoxy]acetic acid hydrochloride in the form of a white solid. After two recrystallizations from a mixture of methanol and ether, the product melts at 165–167° C.

STEP B.—[2,3-DICHLORO-4-(2-METHYLENEBUTYRYL)PHENOXY]ACETIC ACID

The Mannich compound obtained as described in Step A is dissolved in 25 ml. of water and the solution made slightly basic by the addition of 10% sodium bicarbonate solution. The resulting solution is heated for 25 minutes on a steam bath, cooled and acidified with 6 N hydrochloric acid to give [2,3-dichloro-4-(2-methylenebutyryl)phenoxy]acetic acid, M.P. 115–118° C. Two recrystallizations from a mixture of benzene and cyclohexane give a white solid product melting at 118.5–120.5° C.

STEP C.—[2,3-DICHLORO-4-(2-METHYLBUTYRYL)PHENOXY]ACETIC ACID

[2,3-dichloro-4 - (2 - methylenebutyryl)phenoxy]acetic acid (15.16 g., 0.05 mole) is dissolved in isopropyl alcohol (150 ml.) and hydrogenated in the presence of a 5% palladium on carbon catalyst (0.50 g.). There is obtained 15.2 g. (100%) of a crude product. Two recrystallizations from a mixture of benzene and cyclohexane and two recrystallizations from butyl chloride give a white crystalline solid identified as [2,3-dichloro-4-(2-methylbutyryl)phenoxy]acetic acid having a melting point of 143.5–144.5° C.

EXAMPLE 23

[2,3-dichloro-4-(4-methylvaleryl)phenoxy]acetic acid

STEP A.—4-METHYL-2',3'-DICHLORO-4'-HYDROXYVALEROPHENONE

A mixture of 2,3-dichloroanisole (53.11 g., 0.3 mole), carbon disulfide (350 ml.) and 4-methylvaleryl chloride (80.77 g., 0.6 mole) is treated under anhydrous conditions with aluminum chloride powder (40.00 g., 0.3 mole), over a period of 5 minutes with stirring. The mixture is stirred for six hours at room temperature and then allowed to stand at room temperature overnight. The reaction mixture is heated with stirring in a 55° C. water bath until the evolution of hydrogen chloride ceases (1½ hours), cooled to room temperature and treated, under anhydrous conditions, with aluminum chloride powder (40.00 g., 0.3 mole), over a period of 5 minutes with stirring. The carbon disulfide solvent is then removed by distillation; an equal volume of dry heptane is added and the mixture is heated on a steam bath with stirring for 3 hours. After cooling to room temperature, the heptane is decanted and the gummy residue is added to a mixture of ice (450 g.) and concentrated hydrochloric acid (45 ml.). The resulting oil is extracted with ether, dried over anhydrous sodium sulfate and the ether then removed under reduced pressure to give a semisolid residue. This material is treated with excess 5% aqueous sodium hydroxide solution and heated under reflux for one hour, then cooled and extracted with ether to remove insoluble oil. The clear aqueous solution is acidified with concentrated hydrochloric acid and the resulting solution is extracted with ether, the ethereal solution dried over anhydrous sodium sulfate and the ether removed under reduced pressure to give a solid. After one recrystallization from hexane there is obtained 65.7 g. (84% of 4-methyl-2',3'-dichloro-4'-hydroxyvalerophenone in the form of white prisms, M.P. 84–86.5° C. Two additional recrystallizations from hexane raised the melting point to 86–87° C.

STEP B.—[2,3-DICHLORO-4-(4-METHYLVALERYL)PHENOXY]ACETIC ACID 4-methyl-2',3'-dichloro-4'-hydroxyvalerophenone (60.1 g., 0.23 mole) in water (246 ml.) is combined with a solution of sodium hydroxide (24.5 g., 0.611 mole) in water (41 ml.). To the resulting solution at 45° C. is added with stirring a solution of chloroacetic acid (29.0 g., 0.307 mole) in water (82 ml.) over a period of one hour at a temperature of 40–45° C. The temperature is raised to 100° C. over a period of 30 minutes and stirring continued at 100° C. for 40 minutes. The reaction mixture at 100° C. is treated with a solution of chloroacetic acid (58.0 g., 0.61 mole) in water (82 ml.) over a period of 2 hours. Simultaneously and during the following 3 hours with stirring at 100° C., a solution of sodium hydroxide (49.1 g., 1.23 moles) in water (82 ml.) is added at intervals when needed to keep the reaction mixture basic. The boiling solution is acidified with concentrated hydrochloric acid. The oil that separates after chilling in an ice bath to room temperature is extracted with ether, dried over anhydrous sodium sulfate and the ether evaporated at reduced pressure to give an oil. The oil is dissolved in benzene and the benzene removed under reduced pressure to give a solid. One recrystallization from cyclohexane and one from carbon tetrachloride gives 49.5 g. (67%) of [2,3-dichloro-4-(4-methylvaleryl)phenoxy]acetic acid in the form of white needles, M.P. 106–108.5° C. Two additional recrystallizations from carbon tetrachloride raises the melting point to 108.5–109.5° C.

EXAMPLE 24

[2,3-dichloro-4-(2,4-dimethylvaleryl)phenoxy]acetic acid

STEP A.—[2,3-DICHLORO-4-(2-METHYLENE-4-METHYLVALERYL)PHENOXY]ACETIC ACID

[2,3-dichloro-4-(4-methylvaleryl)phenoxy]acetic acid (11.17 g., 0.035 mole), prepared as described in Example 23, paraformaldehyde (2.46 g., 0.0816 mole), dry dimethylamine hydrochloride (6.24 g., 0.0764 mole) and acetic acid (14 drops) are combined and heated with stirring on a steam bath for 15 minutes to obtain a homogeneous mixture. The mixture is heated for two hours, during which period suction is applied at 15-minute intervals for a duration of 1 minute. The Mannich reaction product is suspended in water (100 ml.) and extracted with ether and the ether extract (I) saved. The aqueous solution (after removing ether-soluble oil) is made basic by the addition of saturated sodium bicarbonate solution, heated on a steam bath to 80° C. over a period of 3 minutes and maintained at 80–90° C. for 15 minutes. The basic solution is chilled in an ice bath to room temperature and acidified with hydrochloric acid. The resulting oil is extracted with ether, dried over anhydrous sodium sulfate, and the ether removed under reduced pressure to give [2,3-dichloro-4-(2-methylene-4-methylvaleryl)phenoxy]acetic acid.

The ether extract of the Mannich reaction (I) is dried over anhydrous sodium sulfate and the ether removed by reduced pressure evaporation. The product, which is a mixture of [2,3-dichloro-4-(4-methylvaleryl) phenoxy]acetic acid and starting material, is placed in the reaction vessel and treated with the same quantities of dimethylamine hydrochloride, paraformaldehyde and glacial acetic acid as used initially. The mixture is heated as before and the reaction product suspended in water, extracted with ether and the ether extract dried over anhydrous sodium sulfate. The ether is removed by reduced pressure evaporation to give another yield of [2,3-dichloro - 4 - (2-methylene-4-methylvaleryl)phenoxy]acetic acid.

The combined amounts of product (8.94 g., 77% of theory) is recrystallized from carbon tetrachloride in the form of white platelets, M.P. 107–109° C. Further recrystallization from carbon tetrachloride does not change the melting point.

STEP B.—[2,3-DICHLORO-4-(2,4-DIMETHYLVALERYL) PHENOXY]ACETIC ACID

[2,3 - dichloro - 4 - (2-methylene-4-methylvaleryl)phenoxy]acetic acid (2.32 g., 0.007 mole) is dissolved in isopropyl alcohol (75 ml.) and hydrogenated using a 5% palladium on carbon (200 mg.) catalyst. There is obtained a crude yield of 2.3 g. (100%) of [2,3-dichloro-4-(2,4-dimethylvaleryl)phenoxy]acetic acid. Two recrystallizations from methylcyclohexane and two recrystallizations from carbon tetrachloride give a white crystalline solid melting at 104.5–106.5° C.

EXAMPLE 25

[2,3-dichloro-4-(2-ethylbutyryl)phenoxy]acetic acid

STEP A.—2-ETHYL-2′,3′-DICHLORO-4′-HYDROXYBUTYROPHENONE

A mixture of 2,3-dichloroanisole (53.11 g., 0.3 mole), carbon disulfide (350 ml.) and 2-ethylbutyryl chloride (80.77 g., 0.6 mole) is treated under anhydrous conditions with aluminum chloride (80 g., 0.6 mole) over a period of 5 minutes with stirring. The mixture is stirred for 6 hours at room temperature and then allowed to stand at room temperature overnight. The reaction mixture is heated with stirring in a 55° C. water bath until the evolution of hydrogen chloride ceases, cooled to room temperature and treated, under anhydrous conditions, with additional aluminum chloride powder with constant stirring. The mixture then is heated in a 55° C. water bath with stirring for 1½ hours and the carbon disulfide then removed by distillation. An equal volume of dry heptane is added and the mixture is heated on a steam bath with stirring for 3 hours. After cooling to room temperature, the heptane is decanted and the residue is added to a mixture of ice (450 g.) and concentrated hydrochloric acid (45 ml.). The resulting oil is extracted with ether, dried over anhydrous sodium sulfate and the ether then removed under reduced pressure to give a semisolid residue. This material is treated with excess 5% aqueous sodium hydroxide solution and heated under reflux for 1 hour, then cooled and extracted with ether to remove insoluble oil. The clear aqueous solution is acidified with concentrated hydrochloric acid and the resulting oil is distilled to give 34.45 g. (44%) of product in the form of a liquid, B.P. 140–142° C. at 0.5 mm. pressure. After three recrystallizations from hexane, 2-ethyl-2′,3′-dichloro-4′-hydroxybutyrophenone is obtained in the form of white needles, M.P. 85–86° C.

STEP B.—[2,3-DICHLORO-4-(2-ETHYLBUTYRYL) PHENOXY]ACETIC ACID

A solution of sodium (2.53 g., 0.11 mole) in absolute ethanol (300 ml.) is treated first with 2-ethyl-2′,3′-dichloro-4′-hydroxybutyrophenone (26.12 g., 0.1 mole) and then with ethyl bromoacetate (20.04 g., 0.12 mole) and the resulting clear solution is heated under reflux, with stirring, for 2 hours. Then aqueous 5% potassium hydroxide (11.22 g., 0.2 mole) is added and refluxing with stirring is continued for 1 hour longer. The alcohol is removed by distillation at atmospheric pressure and the boiling aqueous residue is made acid to Congo red test paper by the addition of concentrated hydrochloric acid. An oil separation which solidifies after cooling to room temperature. It is extracted with ether, the ethereal extract dried over anhydrous sodium sulfate, and the ether then is removed under reduced pressure to give 31.9 g. (100%) of [2,3 - dichloro-4-(2-ethylbutyryl)phenoxy] acetic acid in the form of a white solid, M.P. 128–139° C. One recrystallization from a mixture of benzene and cyclohexane gives 28.7 g. (90%) of the product in the form of needles, melting at 144.5–145.5° C.

EXAMPLE 26

[2,3-dichloro-4-(cyclopentaneacetyl)phenoxy] acetic acid

STEP A.—2-CYCLOPENTYL-2′,3′-DICHLORO-4′-HYDROXYACETOPHENONE

To a mixture of 2,3-dichloroanisole (38.8 g., 0.213 mole) and cyclopentaneacetyl chloride (25 g., 0.17 mole) in carbon disulfide (250 ml.) there is added, with stirring, aluminum chloride (46.6 g., 0.35 mole). The mixture then is heated at 50–60° C. for 5 hours. The carbon disulfide then is removed by distillation, heptane (200 ml.) and aluminum chloride (26.67 g., 0.2 mole) is added and the mixture stirred and heated on the steam bath for 2 hours. The solvent then is decanted and ice water (400 ml.) is added slowly with external cooling in an ice bath. This is followed by addition of concentrated hydrochloric acid (40 ml.), and extraction with ether. The ether extract is washed with water and the ether then evaporated. The residue is added to 10% sodium hydroxide solution (160 ml.) and the mixture heated on a steam bath for 3 hours to saponify any ester that may have been formed. After acidification with hydrochloric acid, 2 - cyclopentyl-2′,3′-dichloro-4′-hydroxyacetophenone is obtained, M.P. 86–88° C., 28 g. yield. After recrystallization from a mixture of isopropyl alcohol and water and an additional recrystallization from cyclohexane, the product melts at 87–88° C.

STEP B.—[2,3-DICHLORO-4-(CYCLOPENTANEACETYL) PHENOXY]ACETIC ACID

By following substantially the same procedure described in Example 14, Step B, but replacing the phenol there used by an equimolecular quantity of cyclopentyl-2′,3′-dichloro-4′-hydroxyacetophenone there is obtained a 76% yield of [2,3-dichloro-4-(cyclopentaneacetyl) phenoxy]acetic acid which, after crystallization from a mixture of ether and hexane and then from a mixture of benzene and hexane, melts at 127–128° C.

EXAMPLE 27

[2,3-dichloro-4-(cyclohexaneacetyl)phenoxy]acetic acid

STEP A.—2-CYCLOHEXYL-2′,3′-DICHLORO-4′-HYDROXYACETOPHENONE

This product is prepared following substantially the same procedure described in Example 26, Step A, but using the following reactants:

| | | |
|---|---|---|
| 2,3-dichloroanisole | g | 70.0 (0.395 M) |
| Cyclohexaneacetyl chloride | g | 72.2 (0.45 M) |
| Carbon disulfide | ml | 250 |
| Aluminum chloride | g | 26.67 (0.2 M) |

There is thus obtained 60 g. of 2-cyclohexyl-2′,3′-dichloro-4′-hydroxyacetophenone, M.P. 130–132° C.

STEP B.—[2,3-DICHLORO-4-(CYCLOPENTANEACETYL) PHENOXY]ACETIC ACID

By replacing in Example 14, Step B, the 4-(2-ethylbutyryl)-3-chlorophenol by an equimolecular quantity of 2 - cyclohexyl-2′,3′-dichloro-4′-hydroxyacetophenone and following substantially the same procedure described in Example 14, Step B, there is obtained [2,3-dichloro-4-(cyclohexaneacetyl)phenoxy]acetic acid, M.P. 147–148° C.

EXAMPLE 28

[2,3-dimethyl-4-(2-methylbutyryl)phenoxy]acetic acid

STEP A.—[2,3 - DIMETHYL - 4 - [2 - (DIMETHYLAMINO-METHYL)BUTYRYL]PHENOXY]ACETIC ACID HYDROCHLORIDE

This Mannich compound is prepared following substantially the same procedure described in Example 16, Step A, using the following substances:

| | |
|---|---|
| (2,3-dimethyl-4-butyrylphenoxy)acetic acid (from Example 8) _____ g__ | 10 |
| Paraformaldehyde _____ g__ | 1.4 |
| Dimethylamine hydrochloride _____ g__ | 3.56 |
| Glacial acetic acid _____ ml__ | 0.5 |

The viscous homogeneous mixture obtained as a result of the above procedure is dissolved in 90 ml. of ethyl alcohol, filtered and precipitated with 150 ml. of ether. The product is recrystallized from a mixture of ethyl alcohol and ether, filtered and dried in vacuo over phosphorus pentoxide to give 11.8 g. (90%) of [2,3-dimethyl-4 - [2-dimethylaminomethyl)butyryl]phenoxy]acetic acid hydrochloride, M.P. 178.5–180° C. (Corr.)

STEP B.—[2,3-DIMETHYL-4-(2-METHYLENEBUTYRYL)PHENOXY]ACETIC ACID

This product is prepared by substantially the same method described in Example 16, Step B, using 28.1 g. of [2,3 - dimethyl - 4 - [2 - (dimethylaminomethyl)butyryl]phenoxy]acetic acid hydrochloride. The crude product is recrystallized several times from 250 ml. of methylcyclohexane to give 7.0 g. (33%) of [2,3-dimethyl-4-(2-methylenebutyryl)phenoxy]acetic acid, M.P. 83.5–84.5° C. (Corr.)

STEP C.—[2,3-DIMETHYL-4-(2-METHYLBUTYRYL)PHENOXY]ACETIC ACID

[2,3 - dimethyl-4-(2-methylenebutyryl)phenoxy]acetic acid (7.9 g., 0.03 mole) is hydrogenated in isopropanol (80 ml.) in the presence of a 5% palladium on carbon catalyst (0.5g.). There is obtained 6.9 g. (88%) of crude [2,3-dimethyl - 4 - (2 - methylbutyryl)phenoxy]acetic acid which, after several recrystallizations from butyl chloride-hexane (1:1), melted at 77.5–81° C.

EXAMPLE 29

[2-bromo-3-chloro-4-(2-methylbutyryl)phenoxy]acetic acid

STEP A.—2'-CHLORO-3'-BROMO-4'-HYDROXYBUTYROPHENONE

This product is prepared by substantially the same method described in Example 25, Step A, using the following reagents:

| | | |
|---|---|---|
| 2-bromo-3-chloroanisole _____ g__ | 63.5 | (0.287 M) |
| Butyryl chloride _____ g__ | 61.16 | (0.574 M) |
| Carbon disulfide _____ ml__ | 350 | |
| Aluminum chloride _____ g__ | 76.54 | (0.574 M) |

After removal of ether, the product is obtained in the form of a solid. After one recrystallization from cyclohexane, one from a mixture of benzene and cyclohexane and one from carbon tetrachloride, there is obtained 61.3 g. (77%) of 2' - chloro - 3' - bromo - 4' - hydroxybutyrophenone in the form of white prisms, M.P. 107–108.5° C.

STEP B.—(2-BROMO-3-CHLORO-4-BUTYRYLPHENOXY)ACETIC ACID

This product is prepared by substantially the same method described in Example 13, Step A, using the following reagents:

| | | |
|---|---|---|
| 2' - chloro - 3' - bromo - 4' - hydroxybutyrophenone _____ g__ | 60.8 | (0.219 M) |
| Sodium hydroxide _____ g__ | 52.56 | (1.314 M) |
| Chloroacetic acid _____ g__ | 52.09 | (0.657 M) |
| Water _____ ml__ | 471 | |

During the addition of the final portion of chloroacetic acid, the reaction mixture partially solidifies and 500 ml. of boiling water is added to effect solution. There is obtained, after 4 recrystallizations from a mixture of benzene and cyclohexane and one from benzene, 30.6 g. (42%) of (2-bromo - 3 - chloro-4-butyrylphenoxy)acetic acid in the form of white needles, M.P. 105.5–107° C.

STEP C.—[2-BROMO-3-CHLORO-4-(2-METHYLENEBUTYRYL)PHENOXY]ACETIC ACID

This product is prepared by following substantially the same procedures described in Example 19, Steps B and C, using the following reagents:

| | | |
|---|---|---|
| (2 - bromo - 3 - chloro - 4 - butyrylphenoxy)acetic acid _____ g__ | 11.75 | (0.035 M) |
| Paraformaldehyde _____ g__ | 1.23 | (0.0408 M) |
| Dimethylamine hydrochloride _____ g__ | 3.12 | (0.0382 M) |
| Acetic acid _____ drops__ | 7 | |

After dissolving the intermediate Mannich product in 1000 ml. of warm water, adding sodium bicarbonate, heating and working up in the usual manner, there is obtained, after one recrystallization from methylcyclohexane and three from carbon tetrachloride, 7.26 g. (60%) of [2 - bromo - 3 - chloro-4-(2-methylenebutyryl) phenoxy]acetic acid in the form of white needles, M.P. 128–130° C.

STEP D.—[2-BROMO-3-CHLORO-4-(2-METHYLBUTYRYL) PHENOXY]ACETIC ACID

[2-bromo-3-chloro-4-(2 - methylenebutyryl)phenoxy]-acetic acid (2.43 g., 0.007 mole) is dissolved in isopropyl alcohol (75 ml.) and hydrogenated, using as a catalyst 5% palladium on carbon (200 mg.). There is obtained a good yield of 2.4 g. (100%) of [2-bromo-3-chloro-4-(2-methylbutyryl)phenoxy]acetic acid. Two recrystallizations of the product from benzene and one recrystallization from butyl chloride gives a white crystalline solid melting at 147–148° C.

EXAMPLE 30

[2,3-dimethyl-4-(2-ethylbutyryl)phenoxy]acetic acid

The above product is prepared by substantially the same procedure as described in Example 6 using the following substances:

| | | |
|---|---|---|
| (2,3-dimethylphenoxy)acetic acid _____ g__ | 90 | (0.50 M) |
| 2-ethylbutyryl chloride _____ g__ | 84 | (0.62 M) |
| Carbon disulfide _____ ml__ | 400 | |
| Aluminum chloride _____ g__ | 217 | (1.63 M) |

There is thus obtained 65 g. (47%) of [2,3-dimethyl-4-(2-ethylbutyryl)phenoxy]acetic acid which, after recrystallization from methylcyclohexane, melts at 97–98° C.

EXAMPLE 31

[2,3-dimethyl-4-(cyclobutanecarbonyl)phenoxy]acetic acid

To a dry 1-liter, 4-necked, round-bottomed flask equipped with a stirrer, thermometer and reflux condenser capped with a calcium chloride tube is added cyclobutanecarbonyl chloride (37.0 g., 0.31 mole), (2,3-dimethylphenoxy)acetic acid (45.6 g., 0.25 mole) and carbon disulfide (250 ml.). The mixture is cooled to 5° C. in an ice bath and aluminum chloride (109.0 g., 0.82 mole) is added in portions. After addition of the aluminum chloride is complete the reaction mixture is stirred for one hour at room temperature. The mixture is then heated in a water bath at 50° C. for ½ hour and is allowed to stand at room temperature for 2 days and then heated for ½ hour. The mixture is cooled, the carbon disulfide decanted and the residue is hydrolyzed with 300 ml. of ice water and concentrated hydrochloric acid (25 ml.). The product is extracted with two 700 ml. portions of ether and the ether extract washed with water. The ether solution is then treated with six 100 ml. portions of 5% sodium bicarbonate solution and then acidified with hydrochloric acid. An oil separates which solidifies to yield 53.0 g. of product having a melting point of 85–88° C. The product is extracted with cyclohexane using a Soxhlet extractor to obtain 12.63 g. of [2,3-dimethyl-4-(cyclobutanecarbonyl)phenoxy]acetic acid having a melting point of 99–106° C. The product is then recrystallized from 50 ml. of benzene, 35 ml. of hexane and from benzene (25 ml.) and cyclohexane (100 ml.) to yield 7.55 g. of product having a melting point of 106.5–108° C.

EXAMPLE 32

[3-chloro-4-(2-methylbutyryl)phenoxy]acetic acid

[3-chloro-4-(2 - methylenebutyryl)phenoxy acetic acid (6.63 g.) from Example 18, Step B, is dissolved in methanol (50 ml.) and potassium borohydride (3.24 g.) is added. When the exothermic reaction subsides, the reaction mixture is stirred at room temperature for 3 hours. Water (5 ml.) then is added, the mixture heated to boiling, and the solvent then removed by heating on the steam bath. The white solid residue obtained is dissolved in water (25 ml.), and following acidification with 6 N hydrochloric acid, it is extracted with ether. The ethereal extract is washed with water, dried over sodium sulfate, filtered, and the filtrate allowed to evaporate to remove the solvent. The residue is crystallized three times from benzene to give [3-chloro-4-(2-methylbutyryl)phenoxy]-acetic acid which, when mixed with the product of Example 18, Step C, gives no depression in melting point.

EXAMPLE 33

[3-chloro-4-isobutyryl)phenylmercapto]acetic acid

STEP A.—[3-CHLORO-4-(PROPIONYL)PHENYL-MERCAPTO]ACETIC ACID

To a mixture of 55 g. (0.27 mole) of (3-chlorophenylmercapto)acetic acid and 112 g. (0.85 mole) of aluminum chloride in 300 cc. of carbon disulfide is added 25.7 g. (0.27 mole) of propionyl chloride slowly and with stirring during a period of 30 minutes. The mixture is refluxed for 3 hours with carbon disulfide, decanted and the viscous precipitate added to a mixture of ice and hydrochloric acid. The oily product obtained is added to a saturated solution of sodium bicarbonate and an insoluble impurity is filtered off. The filtrate is acidified to precipitate [3-chloro-4-(propionyl)phenylmercapto]acetic acid which, after recrystallization from benzene, gives 31 g. of product melting at 89–91.5° C.

STEP B.—[3 - CHLORO - 4 - [2 - (1-PIPERIDYLMETHYL) PROPIONYL]PHENYLMERCAPTO]ACETIC ACID HYDROCHLORIDE

The above Mannich compound is prepared following substantially the same procedure described in Example 16, Step A, using the following substances:

[3 - chloro - 4 - (propionyl)phenylmer-
capto] acetic acid _____g__ 12.3 (0.0476 M)
Paraformaldehyde _____g__ 2.1 (0.07 M)
Piperidine hydrochloride _____g__ 6.3 (0.052 M)
10% alcoholic hydrogen chloride _cc__ 0.75

The above reaction gives a viscous melt which is dissolved in 125 cc. of boiling isopropyl alcohol. Upon cooling there is obtained 11.1 g. of [3-chloro-4-[2-(1-piperidylmethyl)propionyl]phenylmercapto]acetic acid hydrochloride, M.P. 153–155° C.

STEP C.—[3-CHLORO-4-(METHACRYLOYL)PHENYL-MERCAPTO]ACETIC ACID

A solution of 3.1 g. (0.008 mole) of the Mannich compound obtained as described above in 30 cc. of saturated sodium bicarbonate solution is heated 1 minute on the steam bath. Acidification of the solution precipitates the unsaturated ketone as a gum which soon crystallizes. Several recrystallizations from a mixture of cyclohexane and benzene give 0.6 g. of [3-chloro-4-(methacryloyl)phenylmercapto]acetic acid, M.P. 110–112° C.

STEP D.—[3-CHLORO-4-(ISOBUTYRYL)PHENYL-MERCAPTO]ACETIC ACID

The [3-chloro-4-(methacryloyl)phenylmercapto]acetic acid from Step C is reduced with potassium borohydride by substantially the same procedure described in Example 32 to give [3-chloro-4-(isobutyryl)phenylmercapto]acetic acid.

EXAMPLE 34

[3-methyl-4-(isobutyryl)phenylmercapto]acetic acid

STEP A.—[3-METHYL-4-(PROPIONYL)PHENYL-MERCAPTO]ACETIC ACID

This product is prepared following substantially the same procedure described in Example 33, Step A, employing 0.27 mole of m-tolylmercaptoacetic acid in place of the (3-chlorophenylmercapto)acetic acid employed in that example. There is thus obtained [3-methyl-4-(propionyl)phenylmercapto]acetic acid which, after crystallization from aqueous ethanol, melts at 93.5–94.5° C.

STEP B.—[3 - METHYL - 4 - [2 - (1-PIPERIDYLMETHYL) PROPIONYL]PHENYLMERCAPTO]ACETIC ACID HYDROCHLORIDE

The above Mannich compound is prepared following substantially the same procedure described in Example 16, Step A, using the following substances:

[3-methyl - 4 - (propionyl)phenylmer-
capto]acetic acid _____g__ 17.8 (0.075 M)
Paraformaldehyde _____g__ 3.8 (0.125 M)
Piperidine hydrochloride _____g__ 10.4 (0.085 M)
10% alcoholic hydrogen chloride _cc__ 1

A syrupy melt which soon crystallizes is obtained as a result of the above procedure. After trituration with hot isopropyl alcohol there is obtained 22.5 g. of [3-methyl-4-[2-(1 - piperidylmethyl)propionyl]phenylmercapto]acetic acid hydrochloride, M.P. 172–174° C.

STEP C.—(3-METHYL-4-METHACRYLOYLPHENYL-MERCAPTO)ACETIC ACID

A solution of 13.5 g. (0.036 mole) of the Mannich compound obtained as described above in 150 cc. of saturated sodium bicarbonate solution is heated 2 minutes on the steam bath. Acidification precipitates the unsaturated ketone which, after recrystallization from a mixture of cyclohexane and benzene, gives 3.2 g. of (3-methyl-4-methacryloylphenylmercapto)acetic acid, M.P. 87.5–89.5° C.

STEP D.—(3-METHYL-4-ISOBUTYRYLPHENYL-MERCAPTO)ACETIC ACID

The (3 - methyl-4-methacryloylphenylmercapto)acetic acid from Step C is reduced with potassium borohydride by substantially the same method as described in Example 32 to give (3-methyl-4-isobutyrylphenylmercapto)acetic acid.

EXAMPLE 35

3-(3-chloro-4-isobutyrylphenylmercapto)propionic acid

STEP A.—3-(3-CHLOROPHENYLMERCAPTO) PROPIONIC ACID

A solution of 14.5 g. (0.10 mole) of 3-chlorothiophenol in 125 cc. of 5% sodium hydroxide solution is mixed with a solution of 15.9 g. (0.10 mole) of 3-bromopropionic acid in 150 cc. of saturated sodium bicarbonate solution. After 4 hours the solution is acidified and the precipitated product recrystallized from aqueous ethanol to give 19.6 g. of 3-(3-chlorophenylmercapto)propionic acid, M.P. 79.5–81.5° C.

STEP B.—3-(3-CHLORO-4-PROPIONYLPHENYL-MERCAPTO)PROPIONIC ACID

To a mixture of 8.7 g. (0.04 mole) of 3-(3-chlorophenylmercapto)propionic acid and 16 g. (0.12 mole) of aluminum chloride in 50 cc. of carbon disulfide is added during 30 minutes 4.2 g. (0.045 mole) of propionyl chloride with stirring and refluxing. The mixture is refluxed for an additional 5 hours. Carbon disulfide then is decanted and the viscous precipitate added to ice and hydrochloric acid. The oil that separates solidifies and after recrystallization from aqueous acetic acid gives 3.1 g. of 3-(3-chloro-4-propionylphenylmercapto)propionic acid, M.P. 73–75.5° C.

STEP C.—3 - [CHLORO - 4 - [2 - (1-PIPERIDYLMETHYL) PROPIONYL]PHENYLMERCAPTO]PROPIONIC ACID HYDROCHLORIDE

A mixture of 13.7 g. (0.05 mole) of 2-(3-chloro-4-propinoylphenylmercapto)propionic acid, 2.5 g. (0.085 mole) of paraformaldehyde, 6.7 g. (0.055 mole) of piperidine hydrochloride and 1 cc. of 10% alcoholic hydrogen chloride is heated 1.25 hours on the steam bath to give the Mannich compound which is used in the following step without further purification.

STEP D.—3-(3-CHLORO-4-METHACRYLOYLPHENYLMERCAPTO)PROPIONIC ACID

The syrupy melt obtained by the process described in Step C is triturated with boiling ether. The residue is dissolved in 250 cc. of saturated sodium bicarbonate solution and after 30 minutes the solution is acidified to precipitate the product which, after 5 recrystallizations from a mixture of cyclohexane and benzene, gives 4.5 g. of 3 - (3 - chloro-4-methacrylolylphenylmercapto)propionic acid, M.P. 81–83° C.

STEP E.—3-(3-CHLORO-4-ISOBUTYRYLPHENYLMERCAPTO)PROPIONIC ACID

The 3 - (3-chloro-4-methacrylolylphenylmercapto)propionic acid from Step D is reduced with potassium borohydride following substantially the same method described in Example 32 to give 3-(3-chloro-4-isobutyrylphenyl mercapto)propionic acid.

EXAMPLE 36

(3-chloro-4-butyrylphenoxy)acetamide

In a 50 ml., round-bottomed flask is placed (3-chloro-4-butyrylphenoxy)acetic acid (0.02 mole), obtained as described in Example 2, thionyl chloride (4.76 g., 0.04 mole) and dry benzene (15 ml.) and the flask is fitted with a reflux condenser having a drying tube. The mixture is refluxed on a steam bath for 1 hour; during the initial part of the heating period there is a vigorous evolution of hydrogen chloride. The volatile materials are removed by distillation at 60° C. and the residual product added with stirring to a cold 28% aqueous ammonia solution (100 ml.). The product that precipitates is removed by filtration, washed with water and dried in vacuo to give (3-chloro-4-butyrylphenoxy)acetamide.

EXAMPLE 37

(2,3-trimethylene-4-butyrylphenoxy)acetic acid

By replacing the (3-methylphenoxy)acetic acid employed in Example 6 by an equimolecular quantity of (2,3-trimethylenephenoxy)acetic acid and following substantially the same procedure described in Example 6, there is obtained a white solid which is removed by filtration. Recrystallization of the solid from a mixture of benzene and hexane gives (2,3-trimethylene - 4 - butyrylphenoxy)acetic acid, M.P. 116–118° C.

EXAMPLE 38

(3-fluoro-4-butyrylphenoxy)acetic acid

The above product is prepared following substantially the same procedure described in Example 6 using the following products:

(3-fluorophenoxy)acetic acid _____ g__ 42.5
Butyryl chloride _____ g__ 33.3
Carbon disulfide _____ ml_ 230
Aluminum chloride _____ g__ 108.5

There thus is obtained (3-fluoro - 4 - butyrylphenoxy)acetic acid which, after crystallization from 1000 ml. of benzene, melts at 131.5–133.5° C. (yield, 40 g., 67%).

EXAMPLE 39

(2,3,5,6-tetramethyl-4-butyrylphenoxy)acetic acid

STEP A.—(2,3,5,6-TETRAMETHYLPHENOXY) ACETIC ACID

A 500 ml., 4-necked, round-bottomed flask fitted with stirrer, condenser and two dropping funnels is charged with 40.0 g. of 2,3,5,6-tetramethylphenol and 21.5 g. of sodium hydroxide in 90 ml. of water. The solution is heated at 85–95° C. on a steam bath while 34.5 g. of chloroacetic acid in 35 ml. of water is slowly added. Heating is continued one-half hour and sodium hydroxide (21.5 g.) and chloroacetic acid (34.5 g.) are added to the reaction mixture. Heating is continued for an additional 40 minutes, the solution filtered, acidified with concentrated hydrochloric acid and cooled, whereupon a solid product, 45 g. (82%), is formed. After recrystallization from 600 ml. of heptane, purified (2,3,5,6-tetramethylphenoxy)acetic acid is obtained, M.P. 117–118° C.

STEP B.—(2,3,5,6-TETRAMETHYL-4-BUTYRYL-PHENOXY)ACETIC ACID

This product is prepared following substantially the same procedure described in Example 6 using the following substances:

(2,3,5,6-tetramethylphenoxy)acetic acid _____ g__ 25
Butyryl chloride _____ ml_ 16
Carbon disulfide _____ ml_ 150
Powdered aluminum chloride _____ g__ 52

The above procedure yields 9.6 g. (29%) of the crude product which, after recrystallization from methylcyclohexane, gives (2,3,5,6-tetramethyl - 4 - butyrylphenoxy)-acetic acid, M.P. 143–145° C.

EXAMPLE 40

(3,5-dimethyl-4-butyrylphenoxy)acetic acid

This product is prepared following substantially the same procedure described in Example 6 using the following substances:

(3,5-dimethylphenoxy)acetic acid _____ g__ 108
Butyryl chloride _____ g__ 80
Carbon disulfide _____ ml_ 480
Powdered aluminum chloride _____ g__ 260

The above procedure yields 7.3 g. of crude product which, after distillation and recrystallization from methylcyclohexane, gives (3,5-dimethyl - 4 - butyrylphenoxy)-acetic acid, M.P. 83–86° C.

EXAMPLE 41

(3-chloro-4-caproylphenoxy)acetic acid

A dry, 1-liter, round flask is equipped with a stirrer and reflux condenser. Into the flask is placed caproyl chloride (33.6 g., 0.25 mole), (3-chlorophenoxy)acetic acid (37.3 g., 0.2 mole) and carbon disulfide (200 ml.). Powdered aluminum chloride (83.9 g., 0.63 mole) is added in small portions at 10° C. with mechanical stirring. After half of the aluminum chloride is added, the mixture becomes quite viscous and the remainder of the aluminum chloride is added with hand stirring. When the mixture becomes mobile enough mechanical stirring is resumed and continued for one hour. The mixture then is heated at 50° C. with stirring for an additional three hours. The carbon disulfide is decanted and the aluminum complex is added to 1 kg. of ice and 100 ml. of concentrated hydrochloric acid; a soft, yellow solid forms which is dissolved in benzene and the benzene solution is extracted with 1 liter of 10% sodium bicarbonate in ten portions. The extract is acidified to obtain a green oil which is extracted with ether and the ether extract dried over sodium sulfate. Upon evaporating the ether, the residue obtained is crystallized from a 2:1 mixture of hexane and benzene (using Norite to decolorize the product) and there is thus obtained 13.0 g. of (3-chloro-4-caproylphenoxy)-acetic acid, M.P. 88–89° C.

EXAMPLE 42

(3-chloro-4-heptanoylphenoxy)acetic acid

A dry, 1-liter, round flask is equipped with a stirrer and reflux condenser. Into the flask is placed heptanoyl chloride (37.2 g., 0.25 mole), (3-chlorophenoxy)acetic acid (37.3 g., 0.20 mole) and carbon disulfide (200 ml.). Aluminum chloride (83.9 g., 0.63 mole) is added in small portions at 10° C. with stirring. After half of the aluminum chloride is added, the mixture becomes quite viscous and the remainder of the aluminum chloride is added with hand stirring. When the mixture becomes mobile enough mechanical stirring is resumed and continued for one hour. The mixture then is heated at 50° C. with stirring for an additional three hours. Carbon disulfide is decanted and the aluminum complex formed is decomposed with 1 kg. of ice and 100 ml. of concentrated hydrochloric acid. The acid mixture is extracted with benzene and ether, the solvents evaporated and the solid residue dissolved in 2 liters of 10% sodium bicarbonate solution. The alkaline solution is filtered and acidified with concentrated hydrochloric acid to precipitate the sodium salt of the desired product (53.9 g.) which is collected by filtration. The sodium salt is suspended in water in a separatory funnel, 500 ml. of ether is added and concentrated hydrochloric acid is added gradually with shaking. The sodium salt gradually converts to the acid, is taken up in the ether layer, the ether layer is separated and the solvent evaporated to give an oily residue which is dried by azeotropic distillation with 100 ml. of benzene. The solid residue is crystallized from a 1:1 mixture of hexane and benzene to give 19.8 g. of (3-chloro-4-heptanoylphenoxy) acetic acid, M.P. 102.5–103.5° C. (corr.).

EXAMPLE 43

(4-butyryl-m-phenylenedioxy)diacetic acid 4-butyrylresorcinol, 54 g., is reacted with 113 g. of chloroacetic acid and 96 g. of sodium hydroxide in 480 ml. of water on a steam bath for 5 hours after which it is acidified with hydrochloric acid to give 47.8 g. of (4-butyryl-m-phenylenedioxy)diacetic acid which, after recrystallization from water, melts at 159.2–160° C.

EXAMPLE 44

2-(3-chloro-4-butyrylphenoxy)propionic acid

The above product is prepared by following substantially the same procedure described in Example 6 using the following substances:

2-(3-chlorophenoxy)propionic acid _g__ 20 (0.099 M)
Butyryl chloride _____g__ 13.2 (0.123 M)
Carbon disulfite _____ml__ 150
Aluminum chloride _____g__ 42.89 (0.322 M)

Upon removal of the carbon disulfide, the residue is added to a mixture of 500 g. of ice and 50 ml. of 12 N hydrochloric acid to give a tan oil. This oil is dissolved in ether, the ether solution washed with water and then extracted with dilute sodium bicarbonate solution. The bicarbonate extract is clarified with Norite and acidified with 6 N hydrochloric acid. The solid that separates is collected by filtration and the oily material removed by suction. The remaining product is dissolved in bicarbonate solution, washed with ether, filtered and acidified with 6 N hydrochloric acid. The solid that separates (M.P. 79–82° C.) is recrystallized from a mixture of benzene and ligroin to give 8.35 g. of 2-(3-chloro-4-butyrylphenoxy)-propionic acid, M.P. 80–83.5° C. Additional recrystallizations from a mixture of ligroin and benzene gives the product melting at 82.5–84° C.

EXAMPLE 45

2-(3-chloro-4-butyrylphenoxy)butyric acid

STEP A.—2'-CHLORO-4'-METHOXYBUTYROPHENONE

Petroleum ether (750 ml.) is placed in a 2-liter flask fitted with a mechanical stirrer, thermometer, reflux condenser capped with a calcium chloride drying tube and a flask attached via Gooch tubing. Butyryl chloride (191.8 g., 1.8 mole) and 3-chloroanisole (213.9 g., 1.5 mole) are added and the stirrer started. Anhydrous aluminum chloride (200 g., 1.5 mole) then is added portionwise via the Gooch tubing to the reaction mixture over 30 minutes. After the addition is completed, stirring is continued for another two hours maintaining the temperature at no more than 30° C. The petroleum ether layer is decanted and the viscous material remaining is poured into a mixture of crushed ice (1 kg.) and concentrated hydrochloric acid (450 ml.). The oil that separates is extracted 3 times with 500 ml. portions of ether, the ether extracts washed with 150 ml. of 5% hydrochloric acid, then 2 times with 150 ml. portions of water, and then dried over anhydrous sodium sulfate. The ether is removed and the residue distilled. The fraction boiling at 122–138° C. at 1.5–2.9 mm. pressure is collected giving 298 g. (94%) of 2'-chloro-4'-methoxybutyrophenone admixed with an isomeric compound, 2'-methoxy-4'-chlorobutyrophenone. The mixture is employed in the following step to form the corresponding phenols which are easily separated.

STEP B.—2'-CHLORO-4'-HYDROXYBUTYROPHENONE

The mixture of anisoles obtained as described above (298 g., 1.4 mole) and n-heptane (1,500 ml.) are placed in a reaction flask equipped and assembled as described above. The stirrer is started and aluminum chloride (373.4 g., 2.8 mole) is added portionwise over a period of 15 minutes maintaining the temperature at between 20° and 55° C. The reaction mixture is refluxed for 3 hours on a steam bath and then cooled to room temperature and the heptane layer decanted. The residue is treated with a mixture of crushed ice (1 kg.) and concentrated hydrochloric acid (600 ml.) whcih gives a yellow solid which is extracted 3 times with 500 ml. portions of ether. The combined ether extracts are washed with two 250 ml. portions of water and dried over anhydrous sodium sulfate. The ether is removed and the residue fractionated to give a first fraction, B.P. 145° C. at 0.03 mm., of 2'-hydroxy-4'-chlorobutyrophenone and a second fraction, B.P. 160–178° C. at 0.03 mm., of 2'-chloro-4'-hydroxybutyrophenone. Recrystallization from cyclohexane gives 2'-chloro-4'-hydroxybutyrophenone, M.P. 82.5–84° C. which by gas-liquid chromatography is shown to be pure material.

STEP C.—2-(3-CHLORO-4-BUTYRYLPHENOXY) BUTYRIC ACID

Sodium (4.8 g., 0.21 g. atom) is dissolved in 150 ml. of absolute alcohol to form a solution of sodium ethoxide. 2' - chloro - 4' - hydroxybutyrophenone (39.73 g., 0.20 mole), obtained as described above, is added, the solution heated to boiling and ethyl 2-bromobutyrate (39.01 g. 0.20 mole) added dropwise with stirring during 0.5 hour. The mixture is stirred and refluxed for 4.5 hours and the solvents then distilled on a steam bath. To the residue, sodium hydroxide (16 g., 0.4 mole) in water (150 ml.) is added and the mixture heated with stirring for 2.25 hours. The reaction mixture then is cooled and extracted with ether and acidified with hydrochloric acid. The oil that separates is extracted with ether, the solution dried over anhydrous sodium sulfate and the ether evaporated to give a residue which distills at between 173–197° C. to give a residue which distills at between 173–197° C. at 0.2 mm. pressure to give 46.5 g. (81%) of 2-(3-chloro-4-butyrylphenoxy)butyric acid.

EXAMPLE 46

(2,3-tetramethylene-4-butyrylphenoxy)acetic acid

2',3'-tetramethylene-4'-hydroxybutyrophenone (12.9 g., 0.06 mole) is dissolved in 400 ml. of warm isopropyl alcohol and then 0.075 mole of sodium hydride is added. To the resulting clear solution is added 12.5 g. (0.075 mole) of ethyl bromoacetate and the solution then is treated by substantially the same method as described in Example 45, Step C, to give 13.9 g. of (2,3-tetramethylene-4-butyrylphenoxy)acetic acid, M.P. 100–104° C. Recrystallization from a mixture of benzene and hexane yields pure (2,3-tetramethylene-4-butyrylphenoxy)acetic acid, M.P. 106–108° C.

EXAMPLE 47

[3-chloro-4-(2-methylbutyryl)phenoxy]acetic acid

The above product was made following substantially the same procedure described in Example 16, Step C, using the following substances:

| | |
|---|---|
| [3-chloro - 4 - (2-methylenebutyryl)phenoxy]acetic acid | g 57.1 (0.212 M) |
| Isopropyl alcohol | ml 200 |
| 5% palladium on carbon | g 3.0 |

The above procedure gives 41.2 g. of [3-chloro-4-(2-methylbutyryl)phenoxy]acetic acid, M.P. 138–139.5° C. After further recrystallization from benzene the product melts at 139–140° C.

EXAMPLE 48

(3-trifluoromethyl-4-butyrylphenoxy)acetic acid

STEP A.—3-TRIFLUOROMETHYL-4-BROMOPHENYL ALLYL ETHER 3-trifluoromethyl-4-bromophenol (12.05 g., 0.05 mole) in solution in methanol is added to a solution of potassium hydroxide (2.81 g., 0.05 mole) in 85% methanol (35 ml.). The solvent then is evaporated and the residue dissolved in glycol dimethyl ether (50 ml.). Allyl bromide (6.05 g., 0.05 mole) is added and the mixture then refluxed for 1½ hours. Potassium bromide is removed by filtration and the solvent evaporated. The residue is distilled yielding 10.5 g. of 3-trifluoromethyl-4-bromophenyl allyl ether, B.P. 78° C. at 1 mm. pressure.

STEP B.—3-TRIFLUOROMETHYL-4-(1-HYDROXYBUTYL) PHENYL ALLYL ETHER

To magnesium turnings (2.60 g., 0.14 mole) in ether (150 ml.) there is added 3-trifluoromethyl-4-bromophenyl allyl ether (20 g., 0.0712 mole). The reaction is initiated and kept in progress by the slow addition of ethylene bromide (12.4 g., 0.0712 mole). After the magnesium has been consumed, butyraldehyde (5.12 g., 0.0712 mole) is added and the mixture refluxed for 1½ hour. The reaction mixture then is hydrolyzed by adding it to a saturated solution of ammonium chloride. The product is extracted with ether, the ether extract dried distilled yielding 11 g. of an oil, B.P. 70–102° C. (0.3 mm. pressure). The oil (7.92 g.) is placed on a 4 cm. column of alumina (350 g.) and eluted with benzene until the effluent benzene contains no solute. This effluent is discarded. The product then is eluted with a mixture of benzene and ether (2:1) and then with a mixture of benzene and ether (1:2) until the effluent contains no solute. The combined benzene-ether effluents are combined and evaporated yielding 5.5 g. of 3-trifluoromethyl-4-(1-hydroxybutyl)phenyl allyl ether, $N_D^{25}$ 1.4836.

STEP C.—3-TRIFLUOROMETHYL-4-BUTYRYLPHENYL ALLYL ETHER

The compound prepared in Step B (5.3 g., 0.0193 mole) is dissolved in acetone (30 ml.) and kept at 0° C. (internal temperature) while a solution of chromium trioxide (3.86 g., 0.0396 mole) in a mixture of water (10 ml.) and sulfuric acid (3.26 ml.) is added slowly with stirring. After stirring an additional 2 hours, the mixture is diluted with cold water and extracted with ether. The ether extract is washed with water, dried over sodium sulfate and evaporated yielding an oil (4.9 g.), which, upon distillation at 0.3 mm. pressure, yields pure 3-trifluoromethyl-4-butyrylphenyl allyl ether.

STEP D.—(3-TRIFLUOROMETHYL-4-BUTYRYLPHENOXY)ACETIC ACID 3-trifluoromethyl-4-butyrylphenyl allyl ether (4.4 g., 0.018 mole) and sodium bicarbonate (1 g.) are added to acetone (80 ml.) and the mixture kept at −10° C. (internal temperature) while potassium permanganate (8.54 g., 0.054 mole) is added slowly. The mixture is stirred for 2 hours, diluted with water and sulfur dioxide bubbled through the mixture until a colorless solution is obtained. The product then is extracted with ether, the ether solution extracted with 5% sodium hydroxide solution, and the basic extract chilled, acidified with 12 N hydrochloric acid and again extracted with ether. The ether extract then is dried and evaporated and the residue obtained is crystallized from benzene to yield (3-trifluoromethyl-4-butyrylphenoxy)acetic acid (1.5 g.), M.P. 96–97° C.

EXAMPLE 49

(3,5-dichloro-4-butyrylphenoxy)acetic acid

STEP A.—2',6'-DICHLORO-4'-HYDROXYBUTYROPHENONE

A mixture of 3,5-dichloroanisole (52.7 g., 0.298 mole), carbon disulfide (350 ml.) and butyryl chloride (62.33 g., 0.585 mole) is treated, under anhydrous conditions, with aluminum chloride powder (39.74 g., 0.298 mole), over a period of 5 minutes with stirring. The mixture is stirred for 6 hours at room temperature and then allowed to stand at room temperature overnight. The reaction mixture is heated with stirring in a 55° C. water bath until the evolution of hydrogen chloride ceases (1½ hours), cooled to room temperature and treated, under anhydrous conditions, with aluminum chloride powder (39.74 g., 0.298 mole), over a period of 5 minutes with stirring. The mixture is then heated in a 55° C. water bath with stirring for 1½ hours. The carbon disulfide is removed under reduced pressure and the gummy reaction product added to a mixture of ice (450 g.) and concentrated hydrochloric acid (45 ml.). The resulting oil is extracted with ether, dried over anhydrous sodium sulfate and the ether is removed under reduced pressure. The residual oil was fractionally distilled to give two products. The product boiling at 101–102° C. at 0.15 mm. pressure is 2',4' - dichloro - 6' - hydroxybutyrophenone, yield 36 g. (51%) which, after recrystallization from petroleum ether, melts at 47–48.5° C.

A second fraction (26 g.) boiling at 115–147° C. at 0.15 mm. pressure appears to be principally 2',6'-dichloro - 4' - butyryloxybutyrophenone. This material is treated with excess 5% aqueous sodium hydroxide solution and heated under reflux for 4½ hours. The cooled reaction mixture is extracted with ether to remove insoluble oil and the clear aqueous solution is acidified with concentrated hydrochloric acid. The resulting oil is extracted with ether, dried over anhydrous sodium sulfate and the ether removed under reduced pressure. The residual oil is fractionally distilled and the material boiling at 162–163° C./0.15 mm. is collected, yield 7.0 g. (10%). After two recrystallizations from hexane and two from cyclohexane, 2',6'-dichloro-4'-hydroxybutyrophenone is obtained in the form of colorless prisms, M.P. 75.5–76.5° C.

STEP B.—(3,5-DICHLORO-4-BUTYRYLPHENOXY) ACETIC ACID

2',6' - dichloro - 4' - hydroxybutyrophenone (6.41 g., 0.0275 mole) in water (30 ml.) is combined with a solution of sodium hydroxide (2.2 g., 0.055 mole) in water (5 ml.). To the resulting solution at 45° C. is added with stirring a solution of chloroacetic acid (2.6 g., 0.0275 mole) in water (10 ml.), over a period of 1 hour at a temperature of 40–45° C. The temperature is raised to 100° C. over a period of 30 minutes and stirring continued at 100° C. for 40 minutes. The reaction mixture at 100° C. is treated with a solution of chloroacetic acid (5.2 g., 0.055 mole) in water (10 ml.) over a period of 2 hours. Simultaneously and during the following 3 hours of stirring at 100° C., a solution of sodium hydroxide (4.4 g., 0.11 mole) in water (10 ml.) is added at intervals when needed to keep the reaction mixture basic. The boiling solution is acidified with concentrated hydrochloric acid. The oil that separates after cooling to room temperature is extracted with ether, dried over anhydrous sodium sulfate and the ether evaporated at reduced pressure to give an oil. The oil is dissolved in benzene and the benzene removed under reduced pressure to give a waxy solid. After one recrystallization from cyclohexane and one from a mixture of benzene and cyclohexane, there is obtained 5.29 g. (65%) of (3,5-dichloro-4-butyrylphenoxy)acetic acid, a crystalline material, M.P. 111.5–113° C. After a further recrystallization from methylcyclohexane the product melts at 112–113° C.

EXAMPLE 50

[3-chloro-4-(cyclopentylcarbonyl)phenoxy]acetic acid

STEP A.—CYCLOPENTYL 2-CHLORO-4-METHOXYPHENYL KETONE

To a pre-cooled mixture of 3-chloroanisole (47.8 g., 0.334 mole), cyclopentanecarbonyl chloride (44.4 g., 0.334 mole) and petroleum ether (300 ml.) is added powdered aluminum chloride (48.0 g., 0.36 mole) over a period of one hour with stirring. This mixture is heated at 40° C. for 6½ hours with intermittent stirring, cooled, poured into a mixture of ice water (400 ml.) and concentrated hydrochloric acid (30 ml.) and extracted with ether. The ether extract is distilled to give cyclopentyl 2-chloro-4-methoxyphenyl ketone, B.P. 120–150° C. (0.5 mm. pressure).

STEP B.—CYCLOPENTYL 2-CHLORO-4-HYDROXYPHENYL KETONE

To a solution of cyclopentyl 2-chloro-4-methoxyphenyl ketone (105 g., 0.438 mole) in purified n-heptane (300 ml.) is added powdered aluminum chloride (146 g., 1.10 mole) over a period of 15 minutes with stirring. The mixture is heated for 5 hours at 100° C., cooled, and added to a mixture of ice water (300 ml.) and concentrated hydrochloric acid (30 ml.), extracted with ether and fractionally distilled. The viscous product obtained, B.P. 162–190° C. (0.4 mm. pressure), is purified by crystallization from a mixture of ether and petroleum ether and recrystallized from benzene to give 8.78 g. (8.92%) of cyclopentyl 2 - chloro - 4 - hydroxyphenyl ketone, M.P. 131–133.5° C.

STEP C.—[3-CHLORO-4-(CYCLOPENTYLCARBONYL) PHENOXY]ACETIC ACID

Cyclopentyl 2-chloro-4-hydroxyphenyl ketone (8.28 g., 0.037 mole) is dissolved in dry 1,2-dimethoxyethane (150 ml.) and 50% sodium hydride in mineral oil (1.92 g., 0.040 mole) is added. To this suspension is added ethyl bromoacetate (7.52 g., 0.045 mole), the mixture refluxed for 2½ hours with stirring, and the solvent then removed and water (50 ml.) and sodium hydroxide (3.6 g., 0.010 mole) added. The mixture is refluxed for 2 hours, cooled and acidified with concentrated hydrochloric acid. The crude product obtained is purified by repeated crystallizations from an acetone-ether solution to give 5.23 g. of [3-chloro-4-(cyclopentylcarbonyl) phenoxy]acetic acid, M.P. 138–139° C.

EXAMPLE 51

[3-chloro-4-(cyclohexylcarbonyl)phenoxy]acetic acid

STEP A.—CYCLOHEXYL 2-CHLORO-4-HYDROXYPHENYL KETONE

To a mixture of 3 - chlorophenetole (29.64 g., 0.188 mole) and cyclohexanecarbonyl chloride (27.6 g., 0.188 mole) in ligroin, aluminum chloride (77.5 g., 0.565 mole) is added gradually with stirring at 5–15° C. After addition is complete, the mixture is allowed to warm to 25° C., stirred for 3 hours and kept at 25–30° C. for 16 hours. The ligroin is decanted and the residue hydrolyzed with 300 ml. of water containing 20 ml. of concentrated hydrochloric acid. The oil that separates is extracted with ether, washed with water, and then with 5% sodium bicarbonate solution. The product is extracted from the washed ether solution with 5% sodium hydroxide solution. The oil that separates upon acidification of the sodium hydroxide extract is extracted with ether and isolated by distillation to give 12.85 g. of cyclohexyl 2 - chloro - 4 - hydroxyphenyl ketone, B.P. 170–200° C. (1.5 mm. pressure), M.P. 78–81° C.

STEP B.—[3-CHLORO-4-(CYCLOHEXYLCARBONYL) PHENOXY]ACETIC ACID

Ethyl bromoacetate (9.0 g., 0.054 mole) is added slowly to a mixture of 50% sodium hydride in mineral oil (2.6 g., 0.054 mole) and the ketone prepared as described in Step A (12.85 g., 0.054 mole) in glycol dimethyl ether (70 ml.) at 30–45° C. The mixture then is heated on a steam bath for 2½ hours with stirring, the solvent evaporated at reduced pressure and a solution of sodium hydroxide (4.7 g.) in water (25 ml.) added to the residue. The mixture is heated for 2 hours, cooled, extracted with ether and acidified with hydrochloric acid. The solid that separates is dissolved in sodium bicarbonate solution and the solution treated with Norite. The product is precipitated by addition of hydrochloric acid, dried and crystallized from benzene to give 10 g. of [3 - chloro - 4 - (cyclohexylcarbonyl)phenoxy]acetic acid, 139–140° C.

EXAMPLE 52

(2-nitro-3-methyl-4-butyrylphenoxy)acetic acid

STEP A.—2'-METHYL-3'-NITRO-4'HYDROXYBUTYROPHENONE

The above product is prepared following substantially the same procedure described in Example 49, Step A, using the following substances:

| | | |
|---|---|---|
| 2-nitro-3-methylanisole | g 84 | (0.50 M) |
| Butyryl chloride | g 107 | (1.0 M) |
| Carbon disulfide | ml 400 | |
| Aluminum chloride | g 134 | (1.0 M) |

After the addition of the second portion of aluminum chloride, 350 ml. of heptane (previously dried over aluminum chloride) is added and the reaction mixture heated at 93° C. for 3 hours. The heptane is decanted, and the solid product scraped onto 200 g. of ice. The product is extracted with 300 ml. of ether which is in turn extracted with 300 ml. of 5% aqueous sodium hydroxide. Acidification with dilute hydrochloric acid to pH 4 gives 18.1 g. (16.5%) of crude 2' - methyl 3' - nitro - 4' - hydroxy - butyrophenone which, after several recrystallizations from methylcyclohexane, melts at 133–134° C.

STEP B.—(2-NITRO-3-METHYL-4-BUTYRYLPHENOXY)ACETIC ACID

A 250 ml. round-bottomed flask equipped with a mechanical stirrer and condenser fitted with a calcium chloride tube is charged with 2' - methyl - 3' - nitro - 4'- hydroxybutyrophenone (4.90 g., 0.022 mole) and ethyl alcohol (60 ml.). Sodium hydride (50% in mineral oil, 1.25 g., 0.025 mole) is added and the solution refluxed on a water bath for five minutes. Ethyl bromoacetate (7.35 g., 0.044 mole) is added and the solution is refluxed on a water bath for 4 hours. Twenty-three ml. of 2 N potassium hydroxide is added, the solution is refluxed for 10 minutes and the alcohol is removed by vacuum distillation. The residue is suspended between 200 ml. of water and 100 ml. of ether in a separatory funnel. The aqueous fraction is acidified to pH 4 with concentrated hydrochloric acid, extracted with 70 ml. of ether (which is dried over sodium sulfate) and evaporated in vacuo to give the crude product. Recrystallization from acetic acid (30 ml.) and water (180 ml.) gives 3.3 g. (53%) of (2 - nitro - 3-methyl - 4 - butyrylphenoxy)acetic acid in the form of a white solid melting at 134–136° C.

EXAMPLE 53

(3-acetamido-4-butyrylphenoxy)acetic acid

STEP A.—2′-ACETAMIDO-4′-HYDROXYBUTYROPHENONE

The above product is prepared following substantially the same procedure described in Example 49, Step A, using the following substances:

3-acetanisidide _____g__ 96.5 (0.58 M)
Butyryl chloride _____g__ 112 (1.06 M)
Carbon disulfide _____ml__ 400
Powdered aluminum chloride _____g__ 320 (2.40 M)

After the addition of the second portion of aluminum chloride, 450 ml. of heptane (previously dried over aluminum chloride) is added. The mixture is heated at 80° C. for 3 hours, cooled, the heptane decanted and the product poured onto 2 kg. ice containing 120 ml. of concentrated hydrochloric acid. Extraction with 1 liter of ether yields 80.0 g. (61%) of 2′ - acetamido - 4′ - hydroxybutyrophenone which, after recrystallization from ethanol (200 ml.) and water (500 ml.), melts at 94–96° C.

STEP B.—(3-ACETAMIDO-4-BUTYRYLPHENOXY) ACETIC ACID

The above product is prepared by substantially the same method described in Example 49, Step B, employing the following materials:

2′ - acetamido - 4′ - hydroxybutyrophenone _____g__ 15.5 (0.07 M)
Chloroacetic acid _____g__ 13.2 (0.14 M)
Sodium hydroxide _____g__ 11.2 (0.28 M)

After heating, the reaction mixture is cooled and acidified with concentrated hydrochloric acid and extracted with ether. The ether is removed at reduced pressure, the residue dissolved in aqueous sodium bicarbonate solution, filtered from a small amount of insoluble residue and acidified with dilute hydrochloric acid to give 4.2 g. (21%) of crude (3-acetamido-4-butyrylphenoxy)acetic acid which, after recrystallization from ethyl alcohol (40 ml.) and water (30 ml.) melts at 177–179° C.

EXAMPLE 54

2-(3-chloro-4-butyrylphenoxy)-3-methylbutyric acid

Sodium (4.8 g., 0.21 mole) is dissolved in absolute ethanol (150 ml.) and 2′-chloro-4′-hydroxybutyrophenone (39.73 g., 0.20 mole), prepared as described in Example 45, Step B, is added in one portion. The resulting solution is stirred while ethyl 2-bromoisovalerate (41.8 g., 0.20 mole) is added dropwise over ½ hour. The mixture then is heated to boiling for 22 hours with stirring. The alcohol is distilled and to the residue is added a solution of sodium hydroxide (10 g., 0.25 mole) in water (150 ml.). The mixture is heated at 90° C. with stirring for two hours and then acidified with concentrated hydrochloric acid. The cooled mixture is extracted with ether, the ether extract washed with water and then extracted with 10% sodium bicarbonate solution. The bicarbonate extract is washed with ether, shaken with decolorizing carbon and acidified with concentrated hydrochloric acid. The oil that separates is extracted with ether, the ether extract dried over sodium sulfate and the ether then evaporated. The residual yellow oil is distilled, B.P. 183–200° C. at 1 mm. pressure, to give 18.3 g. of 2-(3-chloro-4-butyrylphenoxy)-3-methylbutyric acid. A sample purified for analysis melted at 68–69° C.

EXAMPLE 55

[3-chloro-4-(3,3-dimethylbutyryl)phenoxy]acetic acid

STEP A.—2′-CHLORO-3,3-DIMETHYL-4′-HYDROXYBUTYROPHENONE

The reaction of 3,3-dimethylbutyryl chloride (19.9 g., 0.148 mole), 3-chlorophenetole (23 g., 0.148 mole) and aluminum chloride (61 g., 0.444 mole) in petroleum ether is carried out in substantially the same manner described in Example 14, Step A, to give 9.1 g. of 2′-chloro-3,3-dimethyl-4′-hydroxybutyrophenone, B.P. 128–165° C. at 0.8 mm. pressure, M.P. 97–98° C. after crystallization from cyclohexane.

STEP B.—[3-CHLORO-4-(3,3-DIMETHYLBUTYRYL) PHENOXY]ACETIC ACID

By following substantially the same procedure described in Example 14, Step B, but replacing the phenone used in Example 14, Step B, by an equimolecular quantity of 2′-chloro-3,3-dimethyl-4′-hydroxybutyrophenone, there is obtained [3-chloro-4-(3,3-dimethylbutyryl) phenoxy]acetic acid, M.P. 103–104° C. after crystallization from benzene.

EXAMPLE 56

(2,3-dichloro-4-isovalerylphenoxy)acetic acid

STEP A.—2′,3′-DICHLORO-4′-HYDROXYISOVALEROPHENONE

This product is prepared by substantially the same method described in Example 25, Step A, using the following reagents:

2,3-dichloroanisole _____g__ 53.11 (0.3 M)
Isivaleryl chloride _____g__ 72.35 (0.6 M)
Carbon disulfide _____ml__ 350
Aluminum chloride _____g__ 80.00 (0.6 M)

After one recrystallization from cyclohexane and one from carbon tetrachloride, there is obtained 57.2 g. (77%) of 2′,3′-dichloro-4′-hydroxyisovalerophenone in the form of prisms, M.P. 109.5–111.5° C. An additional recrystallization from cyclohexane gives material melting at 110–112° C.

STEP B.—(2,3-DICHLORO-4-ISOVALERYLPHENOXY) ACETIC ACID

This product is prepared following substantially the same method described in Example 49, Step B, using the following reagents:

2′,3′ - dichloro-4′-hydroxyisovalerophenone _____g__ 55.60 (0.225 M)
Sodium hydroxide _____g__ 54.00 (1.350 M)
Chloroacetic acid _____g__ 63.79 (0.675 M)
Water _____ml__ 450

Two recrystallizations from a mixture of benzene and cyclohexane give 43.8 g. (64%) of (2,3-dichloro-4-isovalerylphenoxy)acetic acid in the form of a white solid, M.P. 110.5–112° C.

Two additional recrystallization from the same mixture do not change the melting point.

EXAMPLE 57

[3-chloro-4-(cyclopentaneacetyl)phenoxy]acetic acid

A dry, one-liter, round flask is equipped with a stirrer and reflux condenser. Into the flask is placed cyclopentaneacetyl chloride (58 g. 0.40 mole), (3-chlorophenoxy)acetic acid (72.5 g., 0.4 mole) and carbon disulfide (240 ml.). Aluminum chloride (43.5 g., 0.325 mole) is added in small portions at 10° C. with mechanical stirring. After half of the aluminum chloride is added, the mixture becomes quite viscous and the remainder of the aluminum chloride is added with hand stirring. When the mixture becomes mobile enough, mechanical stirring is resumed and continued for one hour. The mixture then is heated at 50° C. with stirring for an additional three hours. The carbon disulfide is decanted and the residue is added to a mixture of 1 kg. of ice and 30 ml. of concentrated hydrochloric acid. The oil that separates is extracted with ether and the ether extract then is extracted with 10% sodium bicarbonate solution. The bicarbonate extract is acidified with concentrated hydrochloric acid to give [3 - chloro-4-(cyclopentaneacetyl)phenoxy]acetic acid. The product obtained is recrystallized from benzene to give 51.0 g. of [3-chloro-4-(cyclopentaneacetyl)phenoxy]acetic acid, M.P. 107.5–108.5° C.

EXAMPLE 58

(2,5-dichloro-4-butyrylphenoxy)acetic acid

The above product is prepared following substantially the same procedure described in Example 1, Step B, using the following substances:

| | | |
|---|---|---|
| (2,5-dichlorophenoxy)acetic acid | g | 70.2 (0.318 M) |
| Carbon disulfide | ml | 450 |
| Butyryl chloride | g | 42.41 (0.398 M) |
| Powdered aluminum chloride | g | 137.87 (1.034 M) |

The (2,5-dichloro-4-butyrylphenoxy)acetic acid obtained melts at 136–137° C.

EXAMPLE 59

(2,5-dimethyl-4-butyrylphenoxy)acetic acid

The above product is prepared following substantially the same procedure described in Example 6 using the following substances:

| | | |
|---|---|---|
| (2,5-dimethylphenoxy)acetic acid | g | 51 |
| Butyryl chloride | g | 37 |
| Carbon disulfide | ml | 230 |
| Powdered aluminum chloride | g | 123 |

The above procedure yields 59.6 g. (84%) of crude product which, after crystallization from benzene, gives (2,5-dimethyl-4-butyrylphenoxy)acetic acid, M.P. 125.8–127° C.

EXAMPLE 60

[3-chloro-4-(cyclohexaneacetyl)phenoxy]acetic acid

This compound is prepared by substantially the same procedure described in Example 57, using the following reagents:

| | | |
|---|---|---|
| Cyclohexaneacetyl chloride | g | 32.3 (0.205 M) |
| (3-chlorophenoxy)acetic acid | g | 36.3 (0.205 M) |
| Aluminum chloride | g | 43.5 (0.325 M) |
| Carbon disulfide | ml | 240 |

There is thus obtained 22.3 g. of [3-chloro-4-(cyclohexaneacetyl)phenoxy]acetic acid which, after crystallization from benzene, melts at 118–118.5° C.

EXAMPLE 61

[2-methyl-3-chloro-4-(2-ethylbutyryl)phenoxy]acetic acid

STEP A.—2-ETHYL-2'-METHYL-3'-CHLORO-4'-HYDROXYBUTYROPHENONE

The above product is prepared following substantially the same procedure described in Example 14, Step A, using the following substances:

| | | |
|---|---|---|
| 2-methyl-3-chloroanisole | g | 59 (0.38 M) |
| Aluminum chloride | g | 101 (0.76 M) |
| Carbon disulfide | ml | 440 |
| 2-ethylbutyryl chloride | g | 102 (0.76 M) |
| Heptane | ml | 350 |

The crude product obtained as described by the above procedure is recrystallized from 400 ml. of methylcyclohexane to give 40.0 g. (44%) of 2-ethyl-2'-methyl-3'-chloro - 4'-hydroxybutyrophenone which melts at 87–89° C.

STEP B.—[2-METHYL-3-CHLORO-4-(2-ETHYLBUTYRYL)PHENOXY]ACETIC ACID

The above product is prepared following substantially the same procedure described in Example 49, Step B, using the following substances:

| | | |
|---|---|---|
| 2 - ethyl-2'-methyl-3'-chloro-4'-hydroxybutyrophenone | g | 36.0 (0.15 M) |
| Chloroacetic acid | g | 28.3 (0.30 M) |
| Sodium hydroxide | g | 24 (0.60 M) |
| Water | ml | 120 |

The crude product obtained as described by the above procedure is recrystallized from benzene (300 ml.) and cyclohexane (500 ml.) to give 20.0 g. (45%) of [2-methyl-3-chloro-4-(2-ethylbutyryl)phenoxy]acetic acid which melts at 143–144° C.

EXAMPLE 62

[3-chloro-4-(2-propylvaleryl)phenoxy]acetic acid

STEP A.—2-PROPYL-3'-CHLORO-4'-HYDROXYVALEROPHENONE

By replacing the 3-chlorophenetole and the 2-ethylbutyryl chloride employed in Example 14, Step A, by equimolecular quantities of 3-chloroanisole and 2-propylvaleryl chloride, respectively, and following substantially the same procedure described therein, there is obtained 12.96 g. of 2-propyl-3'-chloro-4'-hydroxyvalerophenone in the form of a viscous oil, B.P. 140° C. at 0.5 mm. pressure.

STEP B.—[3-CHLORO-4-(2-PROPYLVALERYL)PHENOXY]ACETIC ACID

The product obtained by the method described in Step A (13.21 g., 0.0518 mole) is added to a solution of sodium (1.19 g., 0.0518 g. atom) dissolved in absolute ethanol (100 ml.). The mixture is heated and stirred while ethyl bromoacetate (8.66 g., 0.0518 mole) is added over a period of 10 minutes. After heating for 6 hours on the steam bath, the ethanol is removed at reduced pressure and the residue treated with sodium hydroxide and worked up by substantially the same procedure described in Example 14, Step B, to give 7.7 g. of [3-chloro-4-(2-propylvaleryl)phenoxy]acetic acid which, after crystallization from benzene, melts at 134–135° C.

EXAMPLE 63

[3-chloro-4-(2-isopropylbutyryl)phenoxy]acetic acid

STEP A.—2-ISOPROPYL-3'-CHLORO-4'-HYDROXYBUTYROPHENONE

By replacing the cyclopentaneacetyl chloride and the 2,3-dichloroanisole employed in Example 26, Step A, by equimolecular quantities of 2-isopropylbutyryl chloride and 3-chloroanisole respectively and following substantially the same procedure described therein, an oil is obtained and is separated by extraction with ether. The ether extract is dried over sodium sulfate and the ether then evaporated and the residue distilled. The fraction boiling at 156–167° C. at 0.5 mm. pressure (15.8 g.) is collected. The product solidifies and after crystallization from cyclohexane gives 7.14 g. of 2-isopropyl-3'-chloro-4'-hydroxybutyrophenone, M.P. 75–77° C.

STEP B.—[3-CHLORO-4-(2-ISOPROPYLBUTYRYL)PHENOXL]ACETIC ACID

By replacing the phenone used in Example 14, Step B, by an equimolecular quantity of 2-isopropyl-3'-chloro-4'-hydroxybutyrophenone and following substantially the same procedure described in Step B of Example 14 there is obtained [3 - chloro-4-(2-isopropylbutyryl)phenoxy]

acetic acid which, after crystallization from a mixture of benzene and hexane, melts at 136–137° C.

EXAMPLE 64

[3-chloro-4-(2,4-dimethylvaleryl)phenoxy]acetic acid

STEP A.—[3-CHLORO-4-(2-METHYLENE-4-METHYL-VALERYL)PHENOXY]ACETIC ACID

[3 - chloro - 4 - (4-methylvaleryl)phenoxy]acetic acid (17.5 g., 0.063 mole), obtained as described in Example 20, paraformaldehyde (1.91 g., 0.063 mole), dimethylamine hydrochloride (5.15 g., 0.063 mole) and acetic acid (0.5 ml.) is heated at 90–100° C. for 4 hours. The mixture then is dissolved in acetone (40 ml.) and ether added until no further precipitate is formed. The ether-acetone mixture (a) is decanted and the residue dissolved in water. The aqueous solution (b) is extracted with ether, made basic with 10% sodium bicarbonate, heated at 80–90° C. for 15 minutes and acidified. The solid that separates is collected by filtration, M.P. 114–116° C. The ether-acetone extract (a) is extracted with 5% sodium bicarbonate solution in portions until acidification of the aqueous extract yields no further precipitate. The bicarbonate extracts are combined and acidified with hydrochloric acid to give a solid, M.P. 111–114° C. The two crops of solids are combined, dried in air at 65° C. and then crystallized from a 9:10 mixture of cyclohexane and benzene and then from benzene to give 14.1 g. of [3 - chloro - 4 - (2-methylene-4-methylvaleryl)phenoxy] acetic acid, M.P. 115–116° C.

STEP B.—[3-CHLORO-4-(2,4-DIMETHYLVALERYL) PHENOXY]ACETIC ACID

[3 - chloro - 4-(2-methylene-4-methylvaleryl)phenoxy] acetic acid (19.05 g., 0.0642 mole) is hydrogenated by substantially the same procedure described in Example 16, Step C, to give 13.1 g. of [3-chloro-4-(2,4-dimethylvaleryl)phenoxy]acetic acid which, after crystallization from benzene, melts at 127–128.5° C.

EXAMPLE 65

[3-methyl-4-(2-isopropyl-3-methylbutyryl)phenoxy] acetic acid

STEP A.—2-ISOPROPYL-3,3′-DIMETHYL-4′-HYDROXYBUTYROPHENONE

To a stirred mixture of 3-methoxytoluene (24.43 g., 0.2 mole), 2-isopropyl-3-methylbutyryl chloride (32.53 g., 0.2 mole) and carbon disulfide (200 ml.) in a 1-liter flask equipped with a reflux condenser and stirrer, aluminum chloride (26.6 g., 0.2 mole) is added slowly with stirring at 10–20° C. by means of an Erlenmeyer flask attached by a Gooch sleeve to a neck of the reaction flask. The mixture then is boiled gently for 6½ hours and the carbon disulfide then removed by distillation. Heptane (100 ml.) and aluminum chloride (26.7 g.) then is added and the mixture refluxed for 7 hours, cooled and ice water (400 ml.) added cautiously with stirring and cooling in an ice bath. The mixture then is acidified with concentrated hydrochloric acid (40 ml.) and the organic components extracted with ether. The ether solution is washed with water and extracted with excess 10% sodium hydroxide in several portions. The basic extracts are combined and washed with ether and acidified with hydrochloric acid. The tan solid that separates (M.P. 114–119° C., 12.85 g.) is crystallized from benzene to give 9.67 g. of 2 - isopropyl - 3,3′-dimethyl-4′-hydroxybutyrophenone, M.P. 123–124.5° C.

STEP B.—[3-METHYL-4-(2-ISOPROPYL-3-METHYLBUTYRYL)PHENOXY]ACETIC ACID

Sodium (0.816 g., 0.0355 g. atom) is dissolved in anhydrous ethanol (100 ml.) in a suitable apparatus and the product prepared in Step A (8.30 g., 0.0355 mole) added to the solution. The mixture is heated to boiling and ethyl bromoacetate (5.93 g., 0.0355 mole) added and the mixture heated for 4 hours. The alcohol then is evaporated and the residue heated at 80–90° C. with 10% sodium hydroxide (50 ml.) for 4 hours. The mixture is cooled, extracted with ether and acidified with hydrochloric acid and the solid that separates extracted with ether. The ether extract is separated, washed with water and dried over sodium sulfate, the ether evaporated and the residue crystallized from a mixture of benzene and cyclohexane to give 1.9 g. of [3-methyl-4-(2-isopropyl-3-methylbutyryl)phenoxy]acetic acid, M.P. 95–95.5° C.

EXAMPLE 66

[3-chloro-4-(3-phenylpropionyl)phenoxy]acetic acid

STEP A.—(3-CHLORO-4-ACETYLPHENOXY) ACETIC ACID

Powdered aluminum chloride (43.5 g., 0.325 mole) and carbon disulfide (150 ml.) are placed in a one-liter, 4-necked flask equipped with a stirrer, dropping funnel, reflux condenser and internal thermometer. (3-chlorophenoxy)acetic acid (17.06 g., 0.1 mole) is added in portions with stirring and then acetyl chloride (7.85 g., 0.125 mole) is added dropwise with stirring over a period of 0.5 hour at a temperature of about 22–26° C. After stirring one hour at room temperature, the reaction flask is placed in a water bath and the temperature maintained at 50° C. for three hours. The carbon disulfide then is decanted and the aluminum complex remaining is added to a mixture of 500 g. of ice and 125 ml. of concentrated hydrochloric acid. The product obtained is reprecipitated from a sodium bicarbonate solution by acidification with hydrochloric acid to give a white solid which, when crystallized from benzene, gives 4.94 g. of (3-chloro-4-acetylphenoxy)acetic acid, M.P. 107–109° C.

STEP B.—[3-CHLORO-4-(3-PHENYLACRYLOYL) PHENOXY]ACETIC ACID 3-chloro-4-acetylphenoxy)acetic acid (4.4 g., 0.0193 mole), prepared as described in Step A, and benzaldehyde (2.1 g., 0.0193 mole) is dissolved in a mixture of sodium hydroxide (1.8 g., 0.045 mole) in 160 ml. of water and 10 ml. of ethanol. The solution is kept at 25–30° C. for 16 hours, acidified with hydrochloric acid and the solid that separates is collected, dried at 65° C. and crystallized from benzene to give 1.2 g. of [3-chloro-4-(3-phenylacryloyl)phenoxy]acetic acid, M.P. 139–140° C.

STEP C.—[3-CHLORO-4-(3-PHENYLPROPIONYL) PHENOXY]ACETIC ACID (3 - chloro - 4-(3-phenylacryloyl)phenoxy]acetic acid (24.2 g., 0.076 mole), prepared as described in Step B, is dissolved in isopropanol (275 ml.) and hydrogenated in the presence of 5% palladium on charcoal at 26° C. and 756 mm. pressure in a Parr apparatus. In about 40 minutes the required amount of hydrogen is absorbed. The solution is warmed and filtered to remove the catalyst, the alcohol is evaporated and the residue crystallized from benzene to give 14.4 g. (59.3%) of [3-chloro-4-(3-phenylpropionyl)phenoxy]acetic acid, M.P. 113–115° C.

EXAMPLE 67

[3-fluoro-4-(2-methylbutyryl)phenoxy]acetic acid

STEP A.—[3 - FLUORO - 4 - [2 - (DIMETHYLAMINOMETHYL)BUTYRYL]PHENOXY]ACETIC ACID HYDROCHLORIDE

In a 100 ml. round flask equipped with an outlet tube suitable for application of intermittent suction, an intimate mixture of (3-fluoro-4-butyrylphenoxy)acetic acid (9.6 g., 0.04 mole), prepared as described in Example 38, paraformaldehyde, (1.4 g., 0.047 mole) dry dimethylamine hydrochloride (3.56 g., 0.044 mole) and glacial acetic acid (0.5 ml.) is heated on the steam bath for about 1.5 hours, during which period suction is applied for about one minute at 15-minute intervals. The viscous, homogenous mixture obtained is triturated in 100 ml. of ether and the product is recrystallized from a mixture of isopropyl alcohol and ether to give 9.6 g. (73%) of [3-fluoro - 4 - [2-dimethylaminomethyl)butyryl]phenoxy]acetic acid hydrochloride, M.P. 173.5–175.5° C.

STEP B.—[3 - FLUORO - 4 - [2-(TRIMETHYLAMMONIUM-METHLY)BUTYRYL]PHENOXL]ACETIC ACID IODIDE

A 300 ml., 3-necked, round-bottomed flask fitted with stirrer, condenser, dropping funnel and calcium chloride tube is charged with [3-fluoro-4-[2-(dimethylaminomethyl)butyryl]phenoxy]acetic acid hydrochloride (10.3 g., 0.031 mole) and 0.31 molar sodium hydroxide (1.24 g., 0.031 mole) in isopropyl alcohol (100 ml.). Methyl iodide (52 g., 0.366 mole) is added dropwise over two hours while the mixture is stirred and heated at 90° C. on a steam bath. The mixture is cooled and the precipitated sodium chloride is removed by filtration. The filtrate is concentrated by vacuum distillation and treated with ether to obtain [3-fluoro-4-[2-(trimethylammoniummethyl)butyryl]phenoxy]acetic acid iodide.

STEP C.—[3-FLUORO-4-(2-METHYLENEBUTYRYL)PHENOXY]ACETIC ACID

The [3-fluoro-4-[2-(trimethylammoniummethyl)butyryl]phenoxy]acetic acid iodide of Step B is dissolved in 150 ml. of water and 50 ml. of saturated aqueous sodium bicarbonate and heated on the steam bath for 75 minutes. After cooling, the solution is acidified with concentrated hydrochloric acid, extracted with 300 ml. of ether and the ether extract dried over sodium sulfate. The ether is removed in vacuo and the residue (5.4 g.) dissolved in 40 ml. of hot benzene, treated with 125 ml. of warm cyclohexane and cooled. The light yellow solid which forms is recrystallized from a mixture of benzene and cyclohexane, filtered and dried to give [3-fluoro-4-(2-methylenebutyryl)phenoxy]acetic acid, M.P. 84–85.5° C. (Corr.)

STEP D.—[3-FLUORO-4-(2-METHYLBUTYRYL)PHENOXY]ACETIC ACID

A solution of [3-fluoro-4-(2-methylenebutyryl)phenoxy]acetic acid (1.45 g., 0.00575 mole), prepared as described in Step C, in isopropanol (50 ml.) is treated with 5% palladium on carbon catalyst (0.5 g.) and hydrogenated. The catalyst is then removed by filtration and the alcohol distilled in vacuo. The crude product is recrystallized from methylcyclohexane (75 ml.) to give 1 g. (69%) of [3 - fluoro - 4-(2-methylbutyryl)phenoxy]acetic acid which melts at 107–108.5° C.

It will be appreciated that the dosage of the novel compounds of this invention will vary over a wide range depending upon the age and weight of the patient to be treated, upon the particular ailment to be treated, and the relative potency of the selected diuretic agent. For these reasons, tablets, pills, capsules, and the like containing, for example, from 25 to 500 mg. or more or less of active ingredient can be made available for the symptomatic adjustment of the dosage to the individual patient. These dosages appear to be well below the toxic dose of the novel compounds of this invention as evidenced by an acute intraperitoneal study which showed no deaths over a 24 hour period when 450 mg./kg. of the compound of Example 7 was administered to mice.

As each of the compounds of this invention can be incorporated in a dosage form similar to that described in the following examples, or in other dosage forms suitable for oral or parenteral administration which can be prepared by well-known methods, only a few examples are included herein to illustrate the preparation of representative dosage forms.

EXAMPLE 68

Dry-filled capsules containing 50 mg. of active ingredient per capsule

| | Per capsule, mg. |
|---|---|
| [2,3-dichloro-4-(2-methylbutyryl)phenoxy]acetic acid | 50 |
| Lactose | 174 |
| Magnesium stearate | 1 |
| | 225 |

Capsule size No. 2.—The [2,3-dichloro-4-(2-methylbutyryl)phenoxy]acetic acid (reduced to a No. 60 powder), lactose and the magnesium stearate are passed through a No. 60 bolting cloth onto the powder and the combined ingredients are admixed for 10 minutes and then filled into No. 2 dry gelatin capsules.

Similar dry-filled capsules can be prepared by replacing the [2,3-dichloro-4-(2-methylbutyryl)phenoxy]acetic acid by any of the other novel compounds of this invention.

The following example illustrates a method by which a compressed tablet can be made containing one or another of the novel compounds of this invention as the active ingredient.

EXAMPLE 69

Compressed tablet containing 50 mg. of active ingredient per tablet

| | Per tablet, mg. |
|---|---|
| (3-ethyl-4-butyrylphenoxy)acetic acid | 50 |
| Lactose U.S.P. No. 80 powder | 130 |
| Starch (as 12½% paste) | 6 |
| Add: | |
| Cornstarch | 3 |
| Magnesium stearate | 1 |
| | 190 |

The (3-ethyl-4-butyrylphenoxy)acetic acid and the lactose are mixed thoroughly and then granulated with the starch paste. While moist, the granulation is passed through a No. 14 screen and then dried at 45° C. in an oven. After thorough drying, the material is passed several times through a No. 14 screen and the cornstarch is passed through a No. 90 bolting cloth onto the granulation and blended, whereafter the magnesium stearate is passed through a No. 60 bolting cloth onto the granulation and thoroughly blended therewith. The material then is compressed into tablets, each weighing 190 mg. and containing 50 mg. of active ingredient per tablet.

The above formulation can be employed to prepare compressed tablets of the other novel compounds of this invention described hereinabove.

It is also contemplated to combine two or more of the compounds of this invention in a unit dosage form or to combine one or more of the compounds with other known diuretic agents, or hypotensive agents, or with other desired therapeutic and/or nutritive agents in dosage unit form.

While the above examples describe the preparation of certain compounds which are illustrative of the novel compounds of this invention, and certain specific dosage forms suitable for administering the novel compounds, it is to be understood that the invention is not to be limited to the specific compounds described in the examples or by the specific reaction conditions described for the preparation of these compounds or by the specific ingredients included in the pharmaceutical preparations, but is to be understood to embrace variations and modifications thereof which fall within the scope of the appended claims.

What is claimed is:

1. A compound of the formula

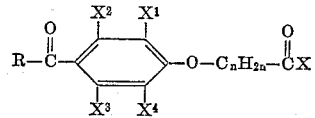

wherein R is a member selected from the group consisting of a lower alkyl group containing at least 3 carbon atoms, cycloalkyl, cycloalkylalkyl and mononuclear aralkyl, X is a member selected from the group consisting of hydroxy, alkoxy and

wherein $R^1$ and $R^2$ represent a member selected from the group consisting of hydrogen and lower alkyl, $X^1$ is a member selected from the group consisting of hydrogen, halogen, lower alkyl and nitro, $X^2$ is a member selected from the group consisting of halogen, lower alkyl, trifluoromethyl, acetamido, and carboxyalkyloxy, $X^3$ and $X^4$ each represents a member selected from the group consisting of hydrogen, halogen and lower alkyl and $n$ is an integer having a value of 1–5.

2. A compound of the formula

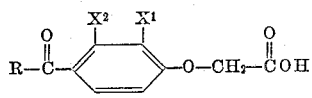

wherein R is lower alkyl containing at least three carbon atoms, $X^1$ is a member selected from the group consisting of hydrogen, halogen and lower alkyl and $X^2$ is a member selected from the group consisting of halogen and lower alkyl.

3. A compound of the formula

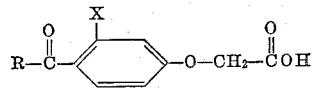

wherein R represents lower alkyl containing at least three carbon atoms and X represents halogen.

4. A compound of the formula

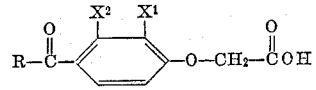

wherein R represents lower alkyl containing at least three carbon atoms and $X^1$ and $X^2$ each represents halogen.

5. A compound of the formula

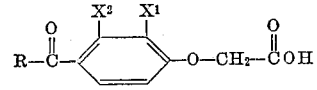

wherein R represents lower alkyl containing at least three carbon atoms and $X^1$ and $X^2$ each represents lower alkyl.

6. A compound of the formula

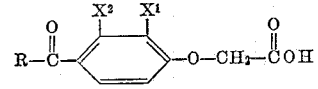

wherein R represents lower alkyl containing at least three carbon atoms, $X^1$ represents halogen and $X^2$ represents lower alkyl.

7. A compound of the formula

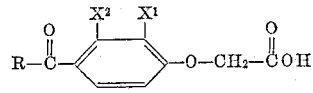

wherein R represents lower alkyl containing at least three carbon atoms, $X^1$ represents lower alkyl and $X^2$ represents halogen.

8. (3-chloro-4-butyrylphenoxy)acetic acid.
9. (2,3-dichloro-4-butyrylphenoxy)acetic acid.
10. (3-bromo-4-butyrylphenoxy)acetic acid.
11. (2-methyl-3-chloro-4-butyrylphenoxy)acetic acid.
12. (2,3-dimethyl-4-butyrylphenoxy)acetic acid.
13. [3-chloro-4-(2-methylbutyryl)phenoxy]acetic acid.
14. [2,3 - dichloro-4-(2-methylbutyryl)phenoxy]acetic acid.
15. [2 - bromo - 3-chloro-4-(2-methylbutyryl)phenoxy] acetic acid.
16. (2,3-dichloro-4-isovalerylphenoxy)acetic acid.
17. (4-n-valeryl-3-chlorophenoxy)acetic acid.
18. [3 - chloro - 4-(2-methyl-n-valeryl)phenoxy]acetic acid.
19. (3-trifluoromethyl-4-butyrylphenoxy)acetic acid.

References Cited
UNITED STATES PATENTS 2,711,424   6/1955   Suter et al. _____ 260—520
2,761,873   9/1956   Gregory et al. _____ 260—516

OTHER REFERENCES

Cousin et al., "Derivatives of 3-Propyl Phenol," Chem. Absts., vol. 31 (1937), pp. 6637–6638.

Kulkarni et al., "Possible Plant Hormones III 2-Acyl and 2-Alkyl-4-Chlorophenoxyacetic Acids," Chem. Absts., vol. 53 (1959), p. 14,986.

LORRAINE A. WEINBERGER, *Primary Examiner.*

S. B. WILLIAMS, D. STENZEL, *Assistant Examiners.*